United States Patent
Okamura et al.

(10) Patent No.: US 9,702,444 B2
(45) Date of Patent: Jul. 11, 2017

(54) METHOD FOR MANUFACTURING FLUID POWER TRANSMISSION

(71) Applicant: YUTAKA GIKEN CO., LTD., Hamamatsu-shi, Shizuoka (JP)

(72) Inventors: Tomohiro Okamura, Hamamatsu (JP); Katsuyoshi Aoshima, Hamamatsu (JP); Masaru Nambara, Hamamatsu (JP); Nobutaka Amma, Hamamatsu (JP); Yuji Horie, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 325 days.

(21) Appl. No.: 14/400,459

(22) PCT Filed: Apr. 23, 2013

(86) PCT No.: PCT/JP2013/061907
§ 371 (c)(1),
(2) Date: Nov. 11, 2014

(87) PCT Pub. No.: WO2013/172158
PCT Pub. Date: Nov. 21, 2013

(65) Prior Publication Data
US 2015/0128418 A1    May 14, 2015

(30) Foreign Application Priority Data

May 15, 2012    (JP) .................................. 2012-111855

(51) Int. Cl.
*F16H 41/28*    (2006.01)
*B23K 1/00*    (2006.01)
(Continued)

(52) U.S. Cl.
CPC ........... *F16H 41/28* (2013.01); *B23K 1/0018* (2013.01); *B23K 11/115* (2013.01);
(Continued)

(58) Field of Classification Search
CPC .. F16H 41/28; F16H 41/04; F16H 2045/0205; F16H 2045/0294;
(Continued)

(56) References Cited

U.S. PATENT DOCUMENTS

| | | | |
|---|---|---|---|
| 3,240,153 A | 3/1966 | Schrader | |
| 4,450,611 A | 5/1984 | Ito et al. | |
| 5,109,604 A * | 5/1992 | Koebele | F16H 41/28 29/889.21 |

FOREIGN PATENT DOCUMENTS

| | | |
|---|---|---|
| CN | 1727729 A | 2/2006 |
| FR | 2808574 A1 | 11/2001 |

(Continued)

OTHER PUBLICATIONS

English Machine Translation JP2007283326A, Oka et al., published Nov. 1, 2007.*

(Continued)

*Primary Examiner* — Sarang Afzali
(74) *Attorney, Agent, or Firm* — Carrier Blackman & Associates, P.C.; Joseph P. Carrier; Jingli Wang

(57) ABSTRACT

A method for manufacturing a fluid power transmission includes a first step of assembling a blade/core provisional assembly having a plurality of blades movably linked to a core, involving aligning the plurality of blades on a blade alignment jig, laying the core over a group of blades while extending a projecting piece provided on each blade through a latching hole provided in the core, and bending an extremity part of the projecting piece thus preventing the projecting piece from coming out of the latching hole, a second step of setting the blade/core provisional assembly at a predetermined position on an inside face of the shell, and a third step of carrying out brazing between the projecting piece and the latching hole and between the blade and the shell. Such (Continued)

method provides a high quality impeller of a fluid power transmission by joining a shell, a blade, and a core.

2 Claims, 21 Drawing Sheets

(51) Int. Cl.
| | | |
|---|---|---|
| *B23K 11/11* | (2006.01) | |
| *B23K 11/31* | (2006.01) | |
| *B23P 15/04* | (2006.01) | |
| *F16H 41/04* | (2006.01) | |
| *B23P 15/00* | (2006.01) | |
| *B23K 101/00* | (2006.01) | |
| *F16H 45/02* | (2006.01) | |

(52) U.S. Cl.
CPC .......... *B23K 11/314* (2013.01); *B23P 15/006* (2013.01); *B23P 15/04* (2013.01); *F16H 41/04* (2013.01); *B23K 2201/001* (2013.01); *F16H 2045/0205* (2013.01); *F16H 2045/0294* (2013.01); *Y10T 29/4933* (2015.01); *Y10T 29/49321* (2015.01); *Y10T 29/49963* (2015.01); *Y10T 29/49993* (2015.01)

(58) Field of Classification Search
CPC ...... B23P 15/006; B23P 15/04; B23K 1/0018; B23K 11/115; B23K 11/314; B23K 2201/001; Y10T 29/4933; Y10T 29/49327; Y10T 29/49329; Y10T 29/49963; Y10T 29/49321; Y10T 29/49993

See application file for complete search history.

(56) References Cited

FOREIGN PATENT DOCUMENTS

| JP | S57-40159 A | 3/1982 |
|---|---|---|
| JP | 2004-052936 A | 2/2004 |
| JP | 2007-283326 A | 11/2007 |
| JP | 2008-082409 A | 4/2008 |

OTHER PUBLICATIONS

English Machine Translation JP2004052936A, Aoki et al., published Feb. 19, 2004.*
Official Communication dated Apr. 20, 2016 corresponding to Chinese Patent Application No. 201380025481.5.

* cited by examiner

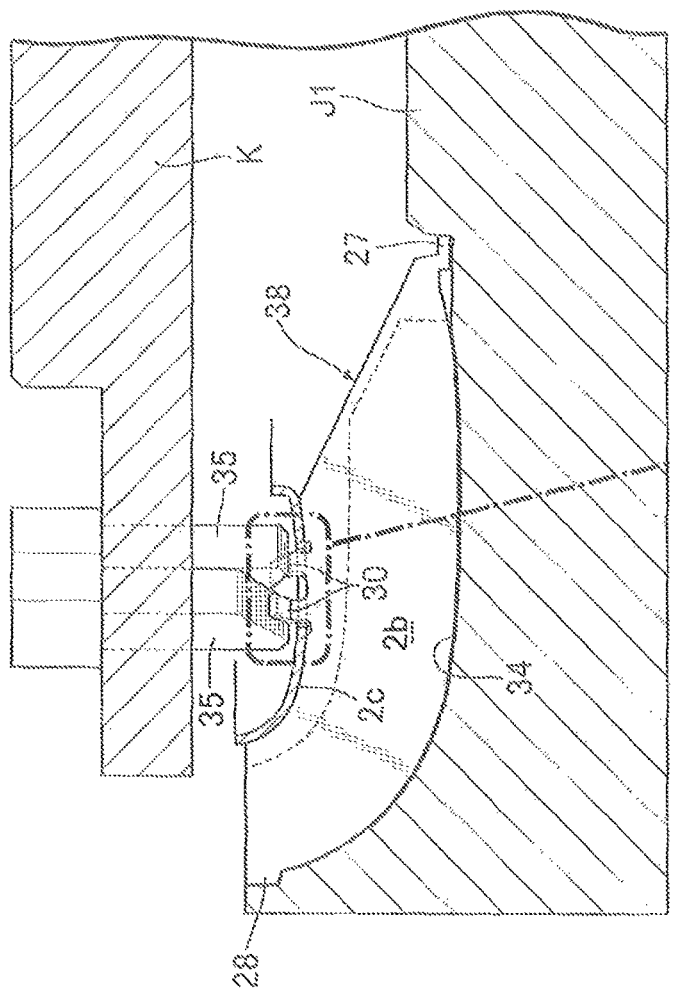
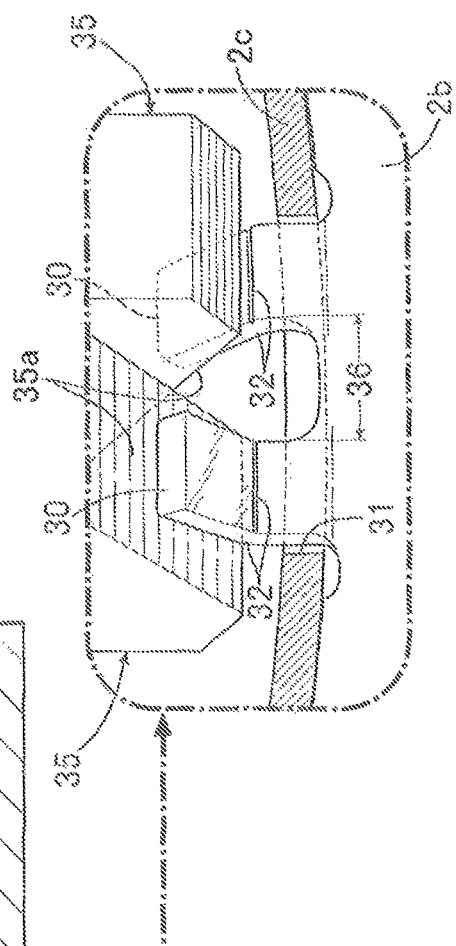
FIG.5

FIG.13
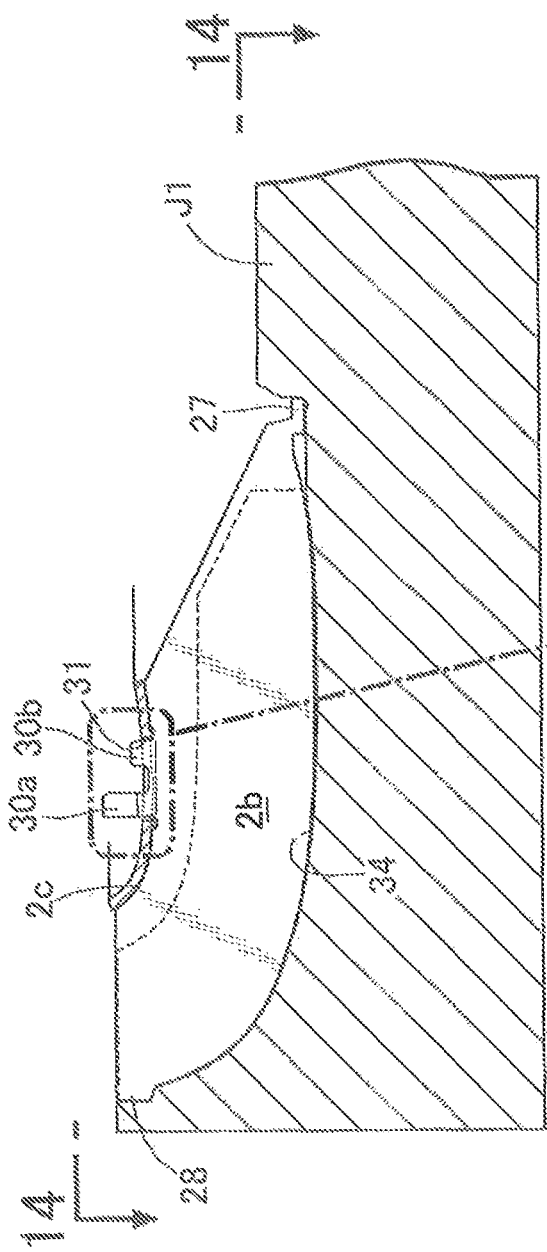
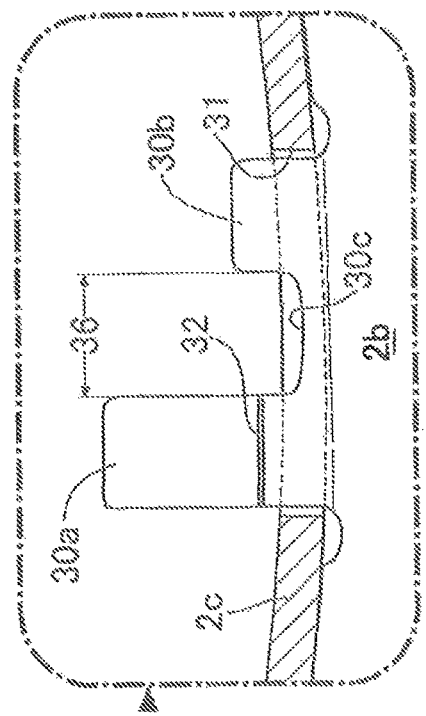

METHOD FOR MANUFACTURING FLUID POWER TRANSMISSION

TECHNICAL FIELD

The present invention relates to a method for manufacturing a fluid power transmission that includes a torque converter or a fluid coupling and, in particular, to an improvement of a method for manufacturing a fluid power transmission equipped with an impeller that includes a bowl-shaped shell, a plurality of blades that are brazed to an inside face of the shell so as to be aligned along a peripheral direction thereof, and an annular core that is brazed to inner ends of the blades so as to link the inner ends to each other.

BACKGROUND ART

Conventionally, when an impeller of such a fluid power transmission is produced, as disclosed in Patent Document 1 below, a plurality of blades are first aligned in a standing state on a fixed position of an inside face of a shell, a core is subsequently laid over the group of these blades so as to fit a projecting piece of each blade into a latching hole of the core, and following this brazing is carried out between the projecting piece and the latching hole and between the blade and the shell respectively.

RELATED ART DOCUMENTS

Patent Documents

Patent Document 1: Japanese Patent Application Laid-open No. 2008-82409

SUMMARY OF THE INVENTION

Problems to be Solved by the Invention

However, assembling three pieces, that is, a shell, a blade, and a core from scratch requires skill, and it cannot be said that the ease of assembly is good.

The present invention has been accomplished in light of such circumstances, and it is an object thereof to provide a method for manufacturing a fluid power transmission that has good ease of assembly and can give a high quality impeller by joining three pieces, that is, a shell, a blade, and a core without distortion.

Means for Solving the Problems

In order to attain the above object, according to a first aspect of the present invention, there is provided a method for manufacturing a fluid power transmission, involving manufacturing an impeller comprising a bowl-shaped shell, a plurality of blades that are brazed to an inside face of the shell so as to be aligned along a peripheral direction thereof, and an annular core that is brazed to inner ends of the blades so as to link the inner ends to each other, characterized in that the method comprises in sequence a first step of assembling a blade/core provisional assembly comprising the plurality of blades movably linked to the core, involving aligning the plurality of blades on a blade alignment jig, laying the core over a group of blades while loosely extending a projecting piece provided on each blade through a latching hole provided in the core, and bending an extremity part of the projecting piece so as to prevent the projecting piece from coming out of the latching hole, a second step of setting the blade/core provisional assembly at a predetermined position on an inside face of the shell, and a third step of carrying out brazing between the projecting piece and the latching hole and between the blade and the shell.

Further, according to a second aspect of the present invention, in addition to the first aspect, each of the blades is provided with a pair of projecting pieces so as to be arranged in a longitudinal direction of the blade, the projecting pieces extending through the latching hole of the core, and in the first step extremity parts of the pair of projecting pieces are bent in opposite directions to each other to thus prevent the pair of projecting piece from coming out of the latching hole.

Furthermore, according to a third aspect of the present invention, in addition to the second aspect, in the third step a ring-shaped brazing material is positioned and disposed so as to engage with a gap between the pair of projecting pieces, and the projecting piece and the latching hole are brazed by melting the brazing material. It should be noted here that the brazing material corresponds to a second brazing material B2 of embodiments of the present invention, which are described later.

Moreover, according to a fourth aspect of the present invention, there is provided a method for manufacturing a fluid power transmission, the fluid power transmission comprising a pump impeller and a turbine impeller disposed so as to oppose each other, the pump impeller comprising a bowl-shaped pump shell, a plurality of pump blades that are brazed to an inside face of the pump shell so as to be aligned along a peripheral direction thereof, and an annular pump core that is brazed to inner ends of the pump blades so as to link the inner ends to each other, and the turbine impeller comprising a bowl-shaped turbine shell, a plurality of turbine blades that are brazed to an inside face of the turbine shell so as to be aligned along a peripheral direction thereof, and an annular turbine core that is brazed to inner ends of the turbine blades so as to link the inner ends to each other, characterized in that each pump blade has formed thereon so as to be arranged in a longitudinal direction of the pump blade a first projecting piece having a long projecting length such that an extremity thereof goes beyond a rotational plane tangential to an outer peripheral edge of the pump core and a second projecting piece having a projecting length that is shorter than that of the first projecting piece, a blade/core provisional assembly is assembled by laying the pump core over a group of pump blades while extending these first and second projecting pieces through a latching hole provided in the pump core and then bending an extremity part of the first projecting piece so as to prevent the first and second projecting pieces from coming out of the latching hole and so that the extremity comes to the vicinity of the rotational plane, the blade/core provisional assembly is subsequently set at a predetermined position on an inside face of the pump shell, the pump impeller is subsequently assembled by positioning a ring-shaped brazing material so as to engage with a gap between the first and second projecting pieces, and by carrying out brazing between the first and second projecting pieces and the latching hole and between the pump blade and the pump shell by melting the brazing material, the turbine impeller being assembled by the same procedure as above, and when the pump impeller and the turbine impeller are opposite each other, the first and second projecting pieces of the pump impeller and the first and second projecting pieces of the turbine impeller being disposed so as to be staggered with respect to each other.

Further, according to a fifth aspect of the present invention, in addition to the fourth aspect, a valley portion between the first and second projecting pieces is formed so that a valley bottom thereof terminates halfway into the latching hole.

Effects of the Invention

In accordance with the first aspect of the present invention, in the first step, the blade/core provisional assembly in which a predetermined number of blades are movably linked to the core can be easily assembled, and since once assembled the blade/core provisional assembly will not come apart, it is possible to easily carry out removal from the blade alignment jig, transfer, transport, and storage. In the subsequent second step, the blades of the blade/core provisional assembly can be easily positioned and set on a predetermined position of the shell mounted on the assembly jig without requiring skill. Moreover, when positioning and setting each blade on the shell, since each blade and the core can freely move in the range of the gap between the projecting piece and the latching hole, not only is it possible to easily position and set them without requiring skill, but it is also possible to prevent the blades from being unnecessarily distorted. In the subsequent third step, in a state in which each part is free from distortion, brazing can be carried out between the projecting piece and the latching hole and between the blade and the shell respectively. Due to the above, it becomes possible to efficiently manufacture a high performance impeller for a fluid power transmission without requiring skill.

In accordance with the second aspect of the present invention, it is possible to prevent the projecting piece from coming out of the latching hole by means of a relatively small amount of bending of the pair of projecting pieces of each blade.

In accordance with the third aspect of the present invention, it is possible to easily and appropriately carry out positioning of the ring-shaped brazing material by utilizing the gap between the pair of projecting pieces for linking each blade to the core, and it is possible to easily carry out brazing between the projecting piece and the latching hole.

In accordance with the fourth aspect of the present invention, it becomes possible to efficiently manufacture a pump impeller and a turbine impeller having high performance without any distortion in the parts and without requiring skill. Moreover, even when a flat-shaped pump core and turbine core are arranged in proximity to each other, it is possible to avoid interference between the first and second projecting pieces of the pump blade and the first and second projecting pieces of the turbine blade when the pump impeller and the turbine impeller rotate relative to each other.

In accordance with the fifth aspect of the present invention, when positioning the ring-shaped brazing material so as to engage with the gap between the first and second projecting pieces and carrying out brazing between the first and second projecting pieces and the latching hole with the molten brazing material, the molten brazing material does not flow out downwardly from the latching hole and remains on the valley part between the second projecting pieces, and it is possible to reliably make it penetrate the gap between the first and second projecting pieces and the latching hole.

BRIEF DESCRIPTION OF DRAWINGS

FIG. 5 is a longitudinal sectional view of a partially-finished product, showing a step of swaging the blade and the core. (first embodiment)

FIG. 13 is a longitudinal sectional view of a partially-finished product, showing a step of setting a blade and a core when manufacturing the pump impeller. (second embodiment)

EXPLANATION OF REFERENCE NUMERALS AND SYMBOLS

B2 Brazing material (second brazing material)
Cp Rotational plane tangential to outer peripheral edge of pump core
Ct Rotational plane tangential to outer peripheral edge of turbine core
J1 Blade alignment jig
J2 Assembly jig
K Swaging tool
T Fluid power transmission (torque converter)
2 Impeller (pump impeller)
3 Impeller (turbine impeller)

2b Blade (pump blade)
3b Blade (turbine blade)
2c Core (pump core)
3c Core (turbine core)
2s Shell (pump shell)
3s Shell (turbine shell)
30 Projecting piece
30a First projecting piece
30b Second projecting piece
31 Latching hole
36 Gap
38 Blade/core provisional assembly Modes For Carrying Out The Invention Modes for carrying out the present invention are explained below by reference to the attached drawings.
First Embodiment
A first embodiment of the present invention is explained below by reference to the attached drawings.

Figure 1:
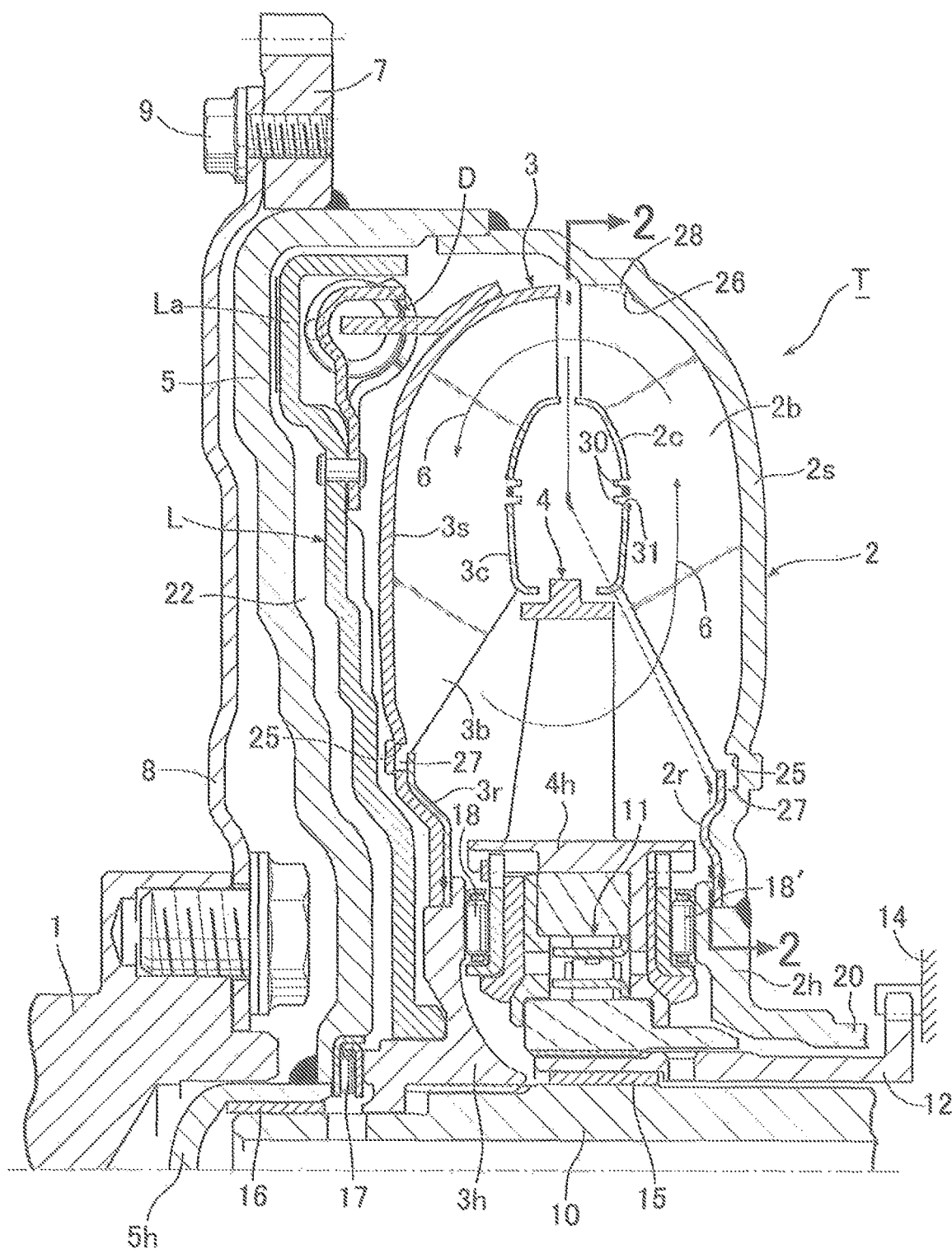
FIG. 1 is a longitudinal sectional side view of a torque converter manufactured by a manufacturing method of a first embodiment of the present invention. (first embodiment)

First, in FIG. 1, a torque converter T as a fluid power transmission includes a pump impeller 2, a turbine impeller 3 disposed so as to oppose the pump impeller 2, and a stator impeller 4 disposed between inner peripheral parts thereof, a circulation circuit 6 for power transmission by means of hydraulic oil being defined between these three impellers 2, 3, and 4.

A transmission cover 5 is provided so as to be integrally connected to the pump impeller 2 by welding, the transmission cover 5 covering an outside face of the turbine impeller 3. A ring gear 7 for starting is welded to an outer peripheral face of the transmission cover 5, and a driving plate 8 joined to an engine crankshaft 1 is secured to the ring gear 7 by means of a bolt 9. A thrust needle bearing 17 is disposed between a hub 3h of the turbine impeller 3 and the transmission cover 5.

An output shaft 10 is disposed in a center part of the torque converter T so as to be coaxial with the crankshaft 1, the output shaft 10 being spline fitted into the hub 3h of the turbine impeller 3 and being rotatably supported by an inner peripheral face of a hub 5h of the transmission cover 5 via a bearing bush 16. The output shaft 10 is the main shaft of a multistage transmission.

A cylindrical stator shaft 12 is disposed on the outer periphery of the output shaft 10, the stator shaft 12 supporting a hub 4h of the stator impeller 4 via a freewheel 11, and a bearing bush 15 is disposed between the output shaft 10 and the stator shaft 12 so as to allow relative rotation thereof. An outer end part of the stator shaft 12 is non-rotatably supported on a transmission case 14.

Thrust needle bearings 18 and 18' are disposed between the hub 4h of the stator impeller 4 and hubs 2h and 3h of the pump impeller 2 and the turbine impeller 3 opposing the stator impeller 4.

Furthermore, an accessory drive shaft 20 provided so as to be connected to the hub 2h of the pump impeller 2 is relatively rotatably disposed on the outer periphery of the stator shaft 12, and an oil pump (not illustrated) for supplying hydraulic oil to the torque converter T is driven by the accessory drive shaft 20.

A clutch chamber 22 is defined between the turbine impeller 3 and the transmission cover 5. Disposed in the clutch chamber 22 are a lockup clutch L that can provide direct coupling between the turbine impeller 3 and the transmission cover 5, and a torque damper D that provides a buffering link between a clutch piston La of the lockup clutch L and the turbine impeller 3.

The structure of the pump impeller 2 and a method for manufacturing same are explained by reference to FIG. 3 to FIG. 10.

Figure 10:
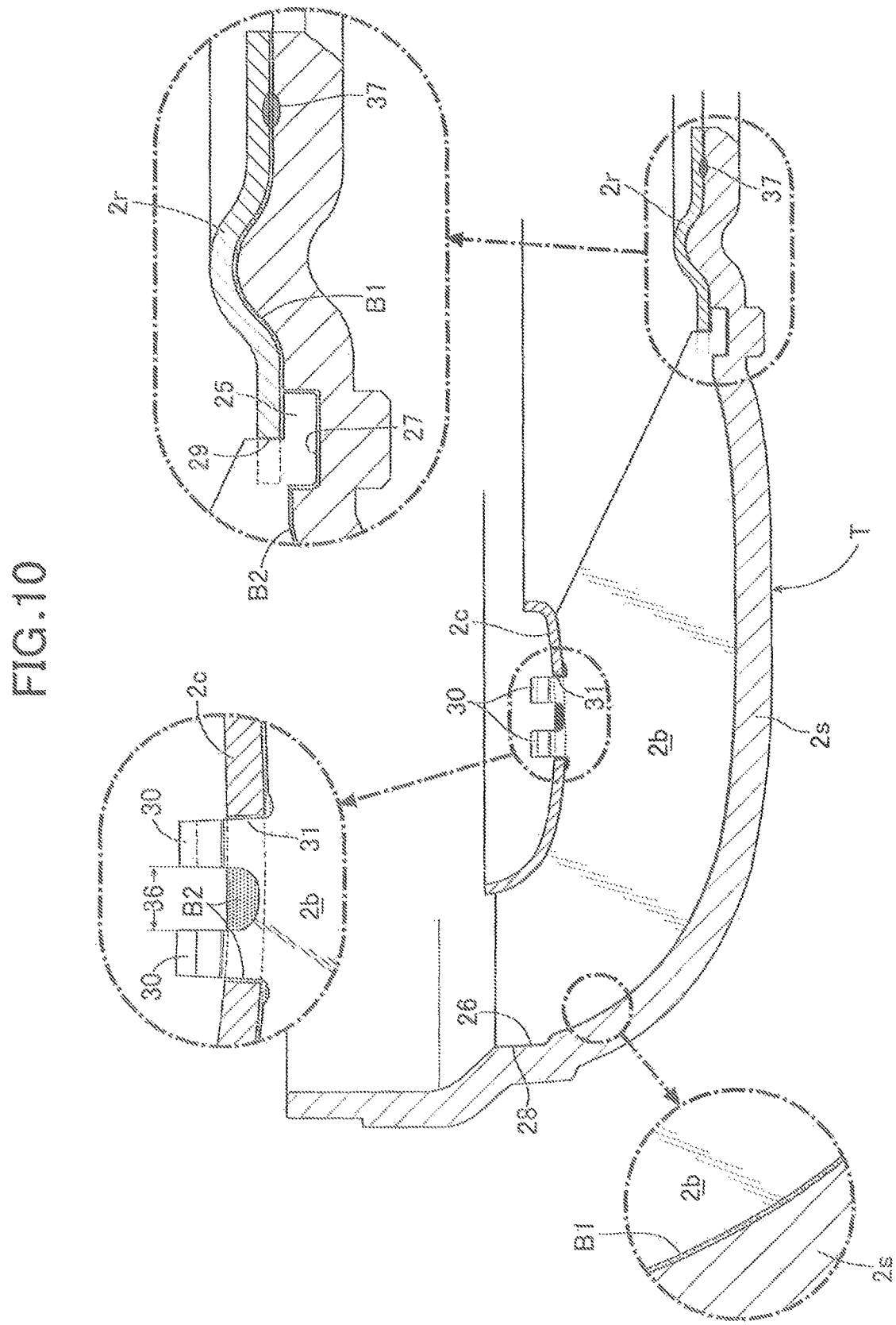
FIG. 10 is a longitudinal sectional view of a finished pump impeller. (first embodiment)

As shown in FIG. 10, the pump impeller 2 is formed from a bowl-shaped pump shell 2s, a large number of pump blades 2b brazed to fixed positions of an inside face of the pump shell 2s, a pump core 2c linking intermediate parts of all of the pump blades 2b to each other, and an annular pump retainer plate 2r brazed to the inside face of the pump shell 2s and retaining radially inner end parts of the pump blades 2b.

A large number of first positioning recesses 25 and second positioning recesses 26 are formed in an inner peripheral part and an outer peripheral part of the inside face of the pump shell 2s respectively so as to be arranged in the peripheral direction, and a first positioning projection 27 and a second positioning projection 28 are formed on opposite end parts of each pump blade 2b, the first positioning projection 27 and the second positioning projection 28 being capable of engaging with the first positioning recess 25 and the second positioning recess 26 respectively.

On the other hand, the pump retainer plate 2r is disposed so that the outer peripheral edge presses the first positioning projections 27 of all of the pump blades 2b against the first positioning recess 25 side. Furthermore, a positioning cutout 29, with which each pump blade 2b engages, is provided in the pump retainer plate 2r.

Figure 3:
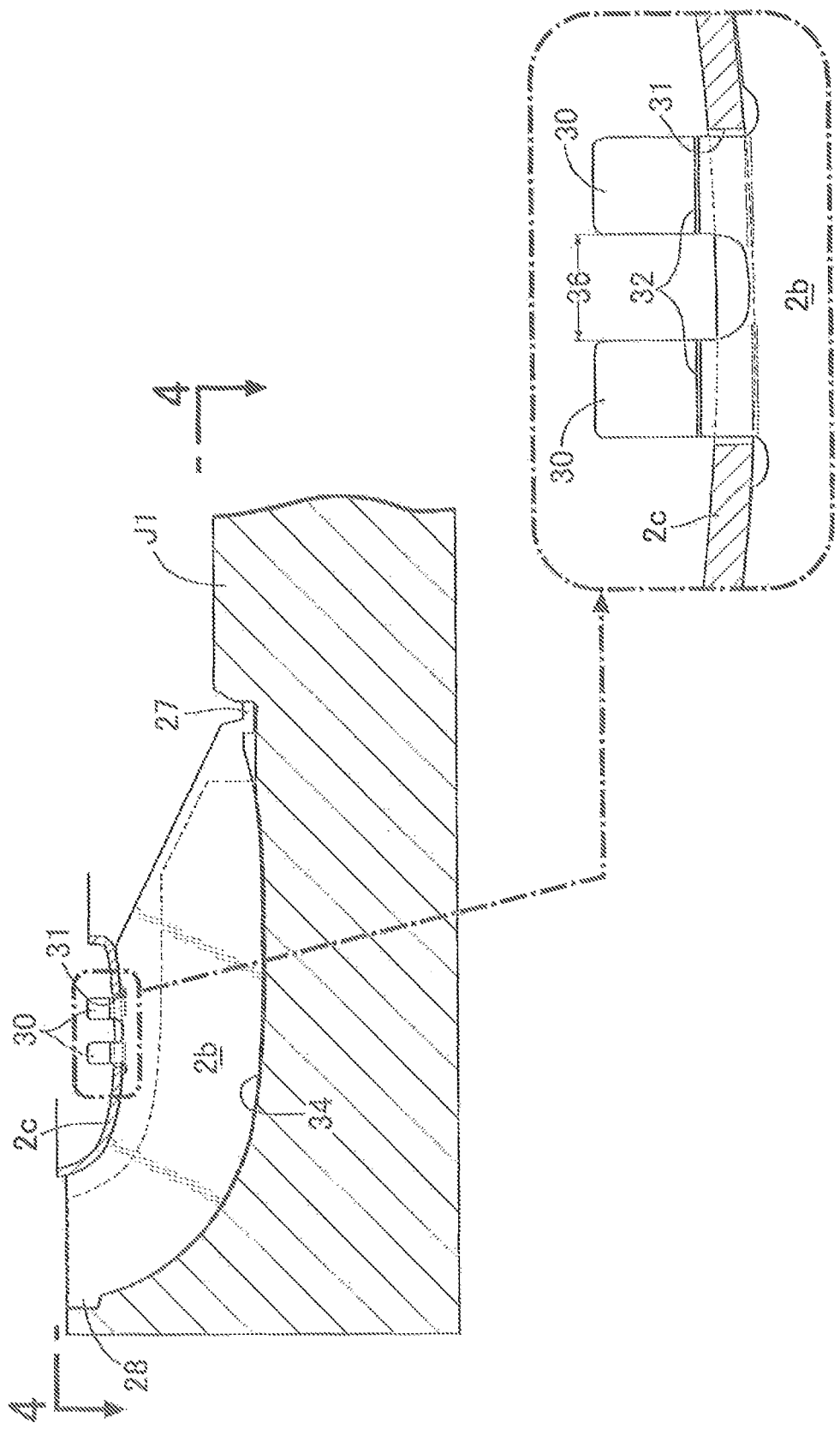
FIG. 3 is a longitudinal sectional view of a partially-finished product, showing a step of setting a blade and a core when manufacturing the pump impeller. (first embodiment)

Furthermore, as shown in FIG. 3, a pair of projecting pieces 30 and 30 arranged in the longitudinal direction with a gap 36 therebetween are formed on each pump blade 2b on the edge opposing the pump core 2c, and a large number of latching holes 31 are bored in the pump core 2c, the projecting pieces 30 and 30 of each pump blade 2b extending loosely through the latching hole 31. That is, each latching hole 31 is formed so as to have a cross-sectional shape that is sufficiently larger than the cross-sectional shape of the pair of projecting pieces 30 and 30. Furthermore, narrow channels 32 and 32 for making sideways bending of the projecting pieces 30 and 30 easy are formed in opposite side faces of the projecting pieces 30 and 30.

Figure 4:
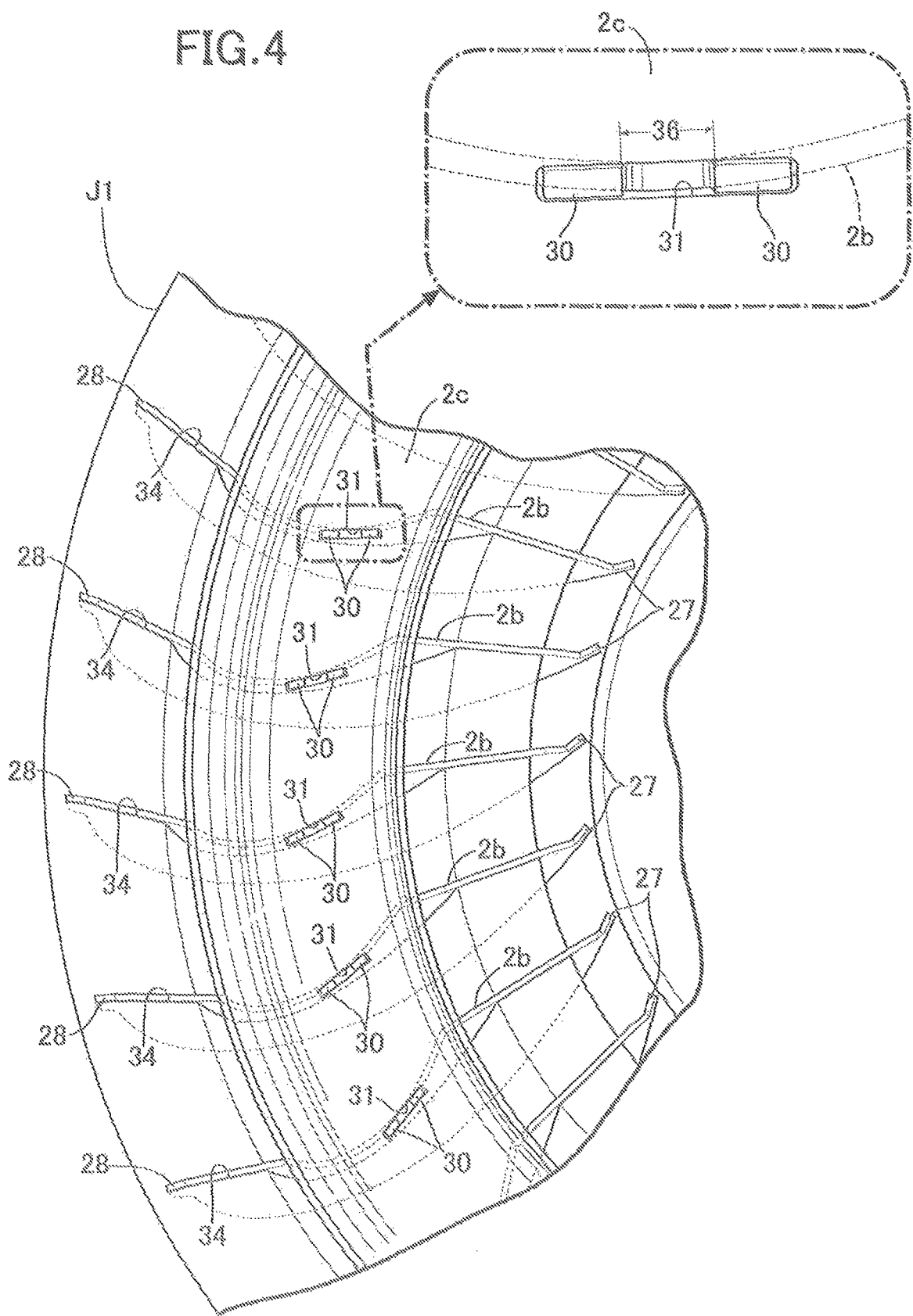
FIG. 4 is a view from arrowed line 4-4 in FIG. 3. (first embodiment)

When manufacturing this pump impeller 2, first, as shown in FIG. 3 and FIG. 4, a blade alignment jig J1 is prepared. A large number of blade positioning grooves 34 corresponding to a predetermined number of pump blades 2b of the pump impeller 2 are formed in this blade alignment jig J1, and the pump blades 2b are fitted into these blade positioning grooves 34. Subsequently, the pump core 2c is placed at a predetermined position on the group of pump blades 2b, and in this process the pair of projecting pieces 30 and 30 of each pump blade 2b are made to extend through the latching hole 31 of the pump core 2c. In this way, the predetermined number of pump blades 2b of the pump impeller 2 are aligned at predetermined positions and the pump core 2c is placed at the predetermined position on the group of pump blades 2b.

Subsequently, as shown in FIG. 5, a swaging tool K is lowered from above the blade alignment jig J1. This swaging tool K has a large number of paired swaging claws 35 and 35 on a lower face, the swaging claws 35 and 35 opposing the pair of projecting pieces 30 and 30 of each pump blade 2b, which extend through the latching hole 31 of the pump core 2c. The paired swaging claws 35 and 35 have inclined faces 35a and 35a inclined in opposite directions to each other as faces opposing the projecting pieces 30 and 30. Therefore, when the swaging tool K is lowered, the inclined faces 35a and 35a of the swaging claws 35 and 35 are pressed against the extremities of the projecting pieces 30 and 30, thus bending the extremity parts of the projecting pieces 30 and 30 in opposite directions to each other. That is, the projecting pieces 30 and 30 open into a V-shape that is wider than the width of the latching hole 31, thus preventing them from coming out of the latching hole 31. In this arrangement, since the channels 32 and 32 are formed in opposite side faces of the projecting pieces 30 and 30 as described above, the projecting pieces 30 and 30 easily bend at the locations of the channels 32 and 32. Therefore, the projecting pieces 30 and 30 can be bent with a relatively small swaging load. Furthermore, due to the extremity parts of the projecting pieces 30 and 30 being bent in opposite directions to each other, the projecting pieces 30 and 30 can be prevented from coming out of the latching hole 31 with a relatively small amount of bending of each projecting piece 30. In this arrangement, the amounts of bending of the projecting pieces 30 and 30 are controlled so as to be the same, thus making the linking relationship between each of the projecting pieces 30 and 30 and the latching hole 31 uniform.

In this way, a blade/core provisional assembly 38 is assembled by movably linking the predetermined number of pump blades 2b to the pump core 2c in the same manner, and this is removed from the blade alignment jig J1. Since the blade/core provisional assembly 38 once assembled will not come apart, it is possible to easily carry out removal from the blade alignment jig J1, transfer, transport, and storage.

Figure 6:
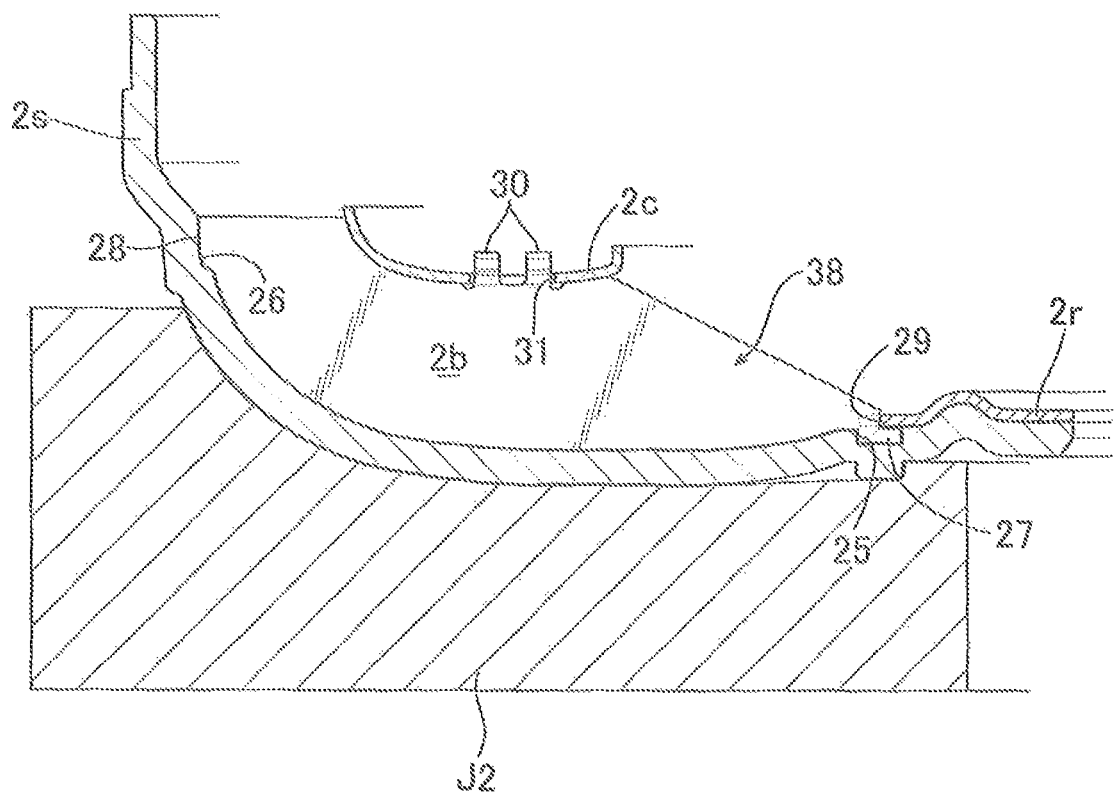
FIG. 6 is a longitudinal sectional view of a partially-finished product, showing a step of setting a blade/core provisional assembly on a shell. (first embodiment)

Subsequently, as shown in FIG. 6, the pump blades 2b of the blade/core provisional assembly 38 are positioned and set at a predetermined position on the pump shell 2s placed on an assembly jig J2. Positioning and setting of each pump blade 2b is completed by engaging the first and second positioning projections 27 and 28 of each pump blade 2b with the first and second positioning recesses 25 and 26 of the pump shell 2s respectively.

Since the predetermined number of pump blades 2b are linked to each other via the pump core 2c, they do not collapse and, moreover, since they can freely move relative to the pump core 2c in the range of the gap between the latching hole 31 and the projecting pieces 30 and 30, positioning and setting thereof can be easily carried out without requiring any skill and, furthermore, since no unreasonable load acts on the pump blades 2b, no unnecessary distortion occurs.

After positioning and setting the pump blades 2b, the pump retainer plate 2r for maintaining their state is laid over upper faces of inner peripheral end parts of the group of pump blades 2b and the pump shell 2s.

Figure 2:
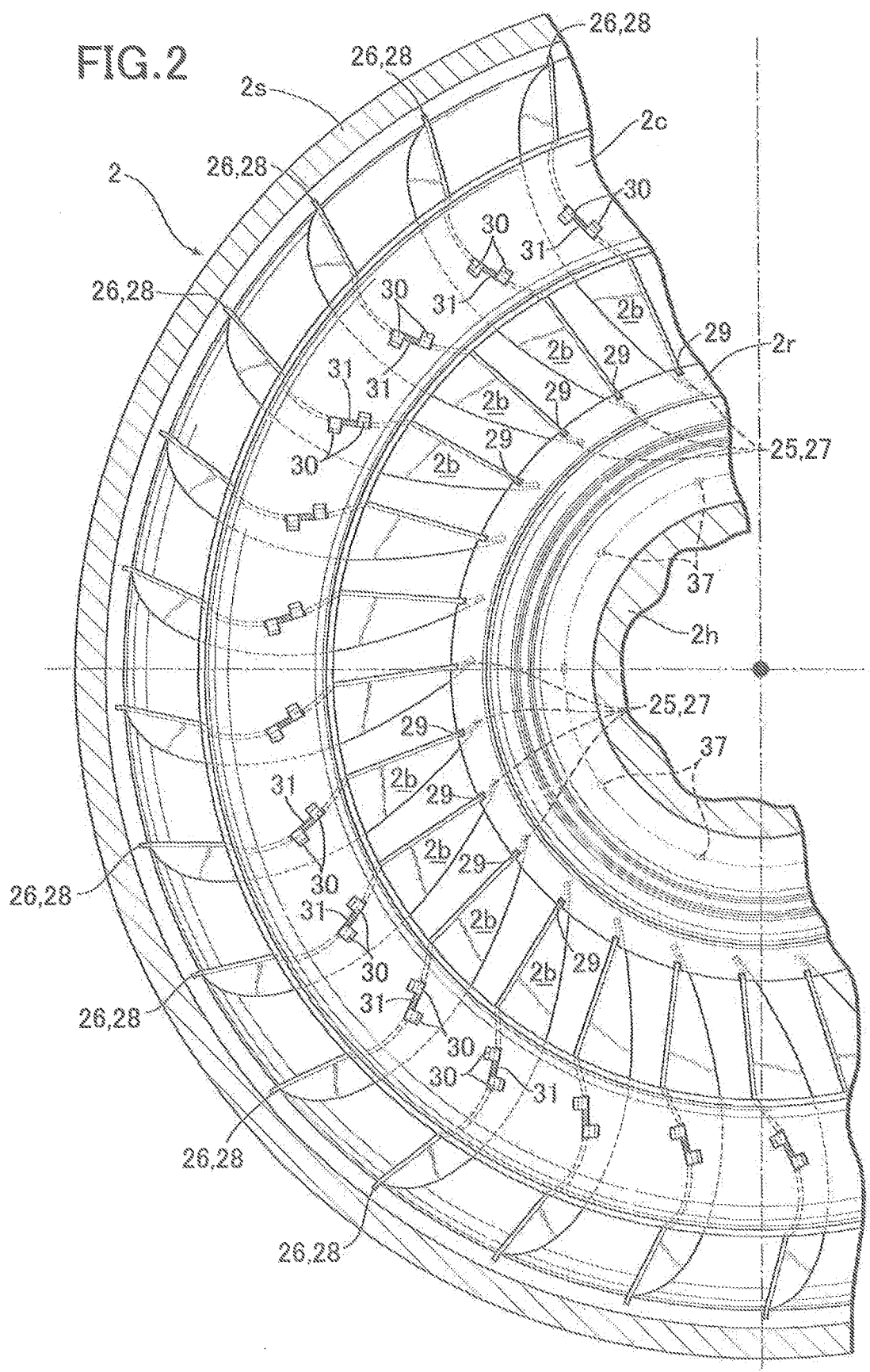
FIG. 2 is a view from arrowed line 2-2 in FIG. 1 (partial plan view of pump impeller). (first embodiment)
Figure 7:
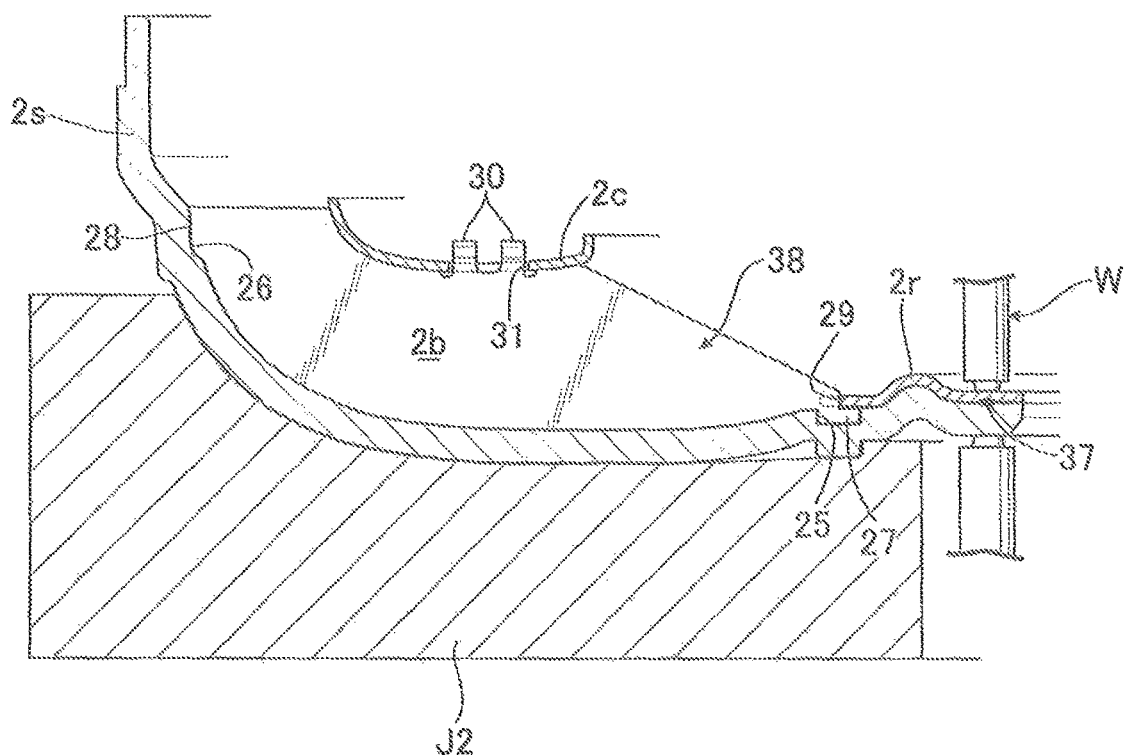
FIG. 7 is a longitudinal sectional view of a partially-finished product, showing a step of welding a pump retainer plate. (first embodiment)

As shown in FIG. 7, the pump retainer plate 2r is spot welded 37 (see also FIG. 2) to the pump shell 2s by a spot welder W. The blade/core provisional assembly 38 is thus provisionally retained on the predetermined position of the pump shell 2s by the pump retainer plate 2r.

Figure 8:
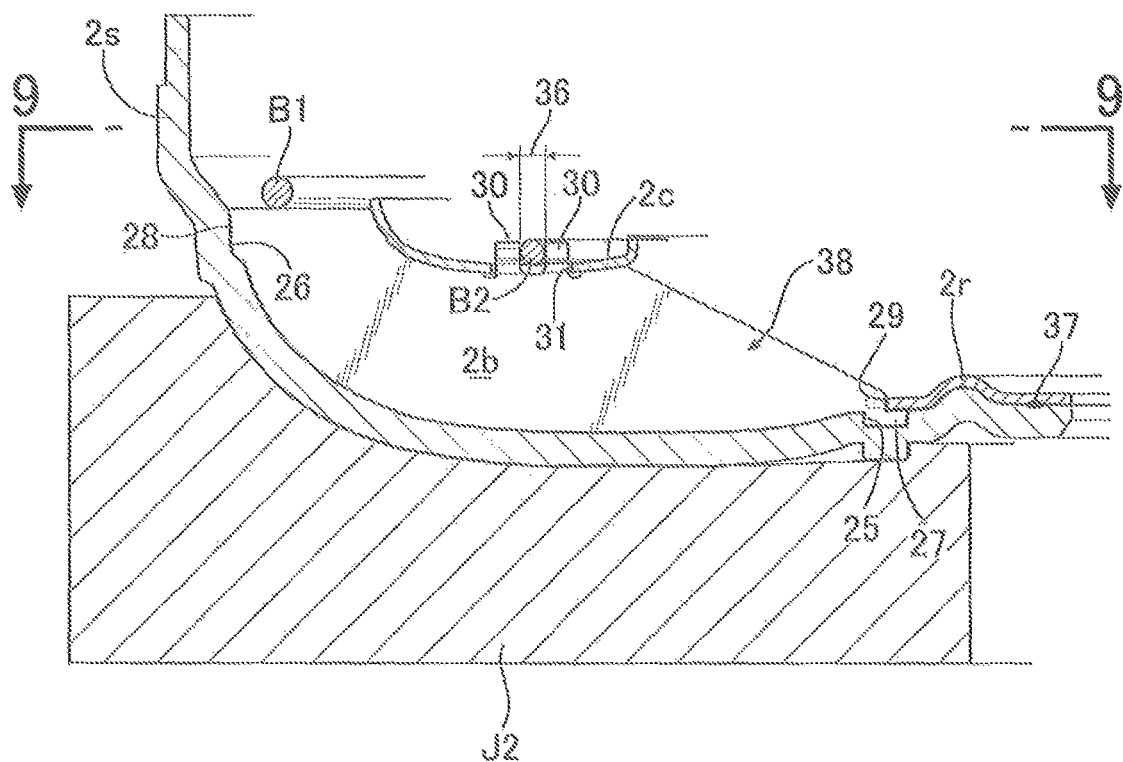
FIG. 8 is a longitudinal sectional view of a partially-finished product, showing a brazing step. (first embodiment)
Figure 9:
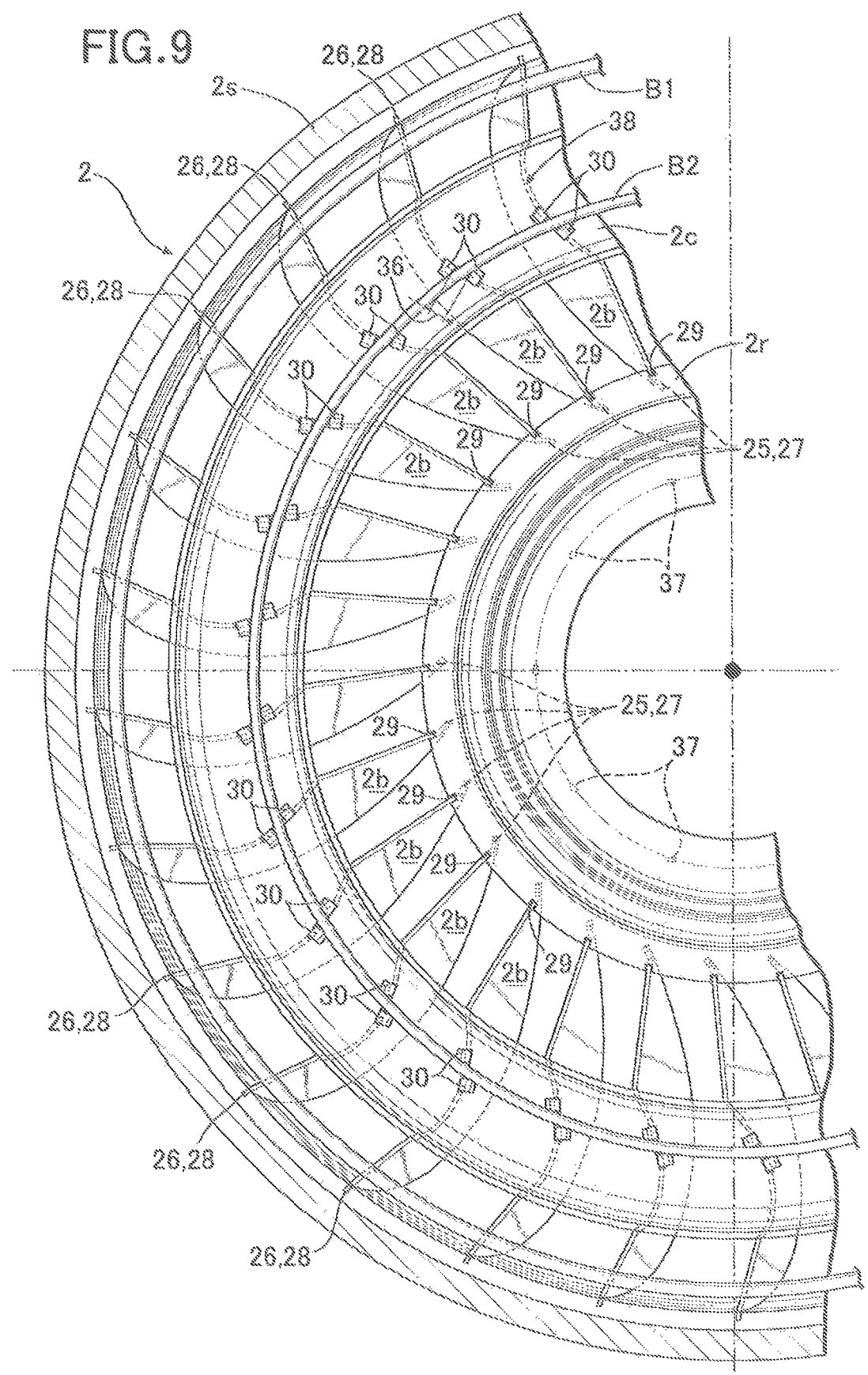
FIG. 9 is a view from arrowed line 9-9 in FIG. 8. (first embodiment)

Subsequently, the pump shell 2s having the blade/core provisional assembly 38 provisionally retained thereon is transferred from the assembly jig J2 to a heating furnace. In this heating furnace, as shown in FIG. 8 and FIG. 9, a ring-shaped first brazing material B1 is placed on upper faces of the group of pump blades 2b so as to follow an inner peripheral face of the pump shell 2s, and a ring-shaped second brazing material B2 is placed on the pump core 2c so as to engage with the gap 36 between the pair of projecting pieces 30 and 30 projecting from the latching hole 31 and bent in opposite directions to each other. That is, the ring-shaped second brazing material B2 can easily and appropriately be positioned by utilizing the gap 36 between the pair of projecting pieces 30 and 30 for linking each pump blade 2b to the pump core 2c. In particular, as in the illustrated example, if a material having a wire diameter that is smaller than the gap 36 is used as the second brazing material B2, the second brazing material B2 is disposed while being in contact with the pump core 2c, and it is possible to more easily and appropriately carry out positioning of the second brazing material B2.

Subsequently, the first and second brazing materials B1 and B2 are thermally melted. The molten first brazing material B1 penetrates by virtue of the capillary phenomenon between the pump shell 2s and each pump blade 2b and between the pump shell 2s and the pump retainer plate 2r, and the molten second brazing material B2 penetrates between each of the projecting pieces 30 and 30 and the latching hole 31, and as shown in FIG. 10 it is therefore possible, due to solidification of the penetrated brazing materials B1 and B2 after cooling, to carry out brazing between the pump shell 2s and each pump blade 2b and between the pump shell 2s and the pump retainer plate 2r without distorting the parts. In this way, it becomes possible to efficiently manufacture the high performance pump impeller 2 without any distortion in the parts and without requiring skill.

The structure of the turbine impeller 3 and the method for manufacturing same are basically the same as those for the pump impeller 2 described above; parts in the figures, corresponding to the pump impeller 2, of the turbine impeller 3 are denoted by reference symbols that end in the same letter, and duplication of the explanation is omitted. That is, the turbine shell is 3s, the turbine blade is 3b, the turbine core is 3c, and the turbine retainer is 3r.

Second Embodiment

A second embodiment of the present invention is now explained by reference to FIG. 11 to FIG. 21.

Figure 11:
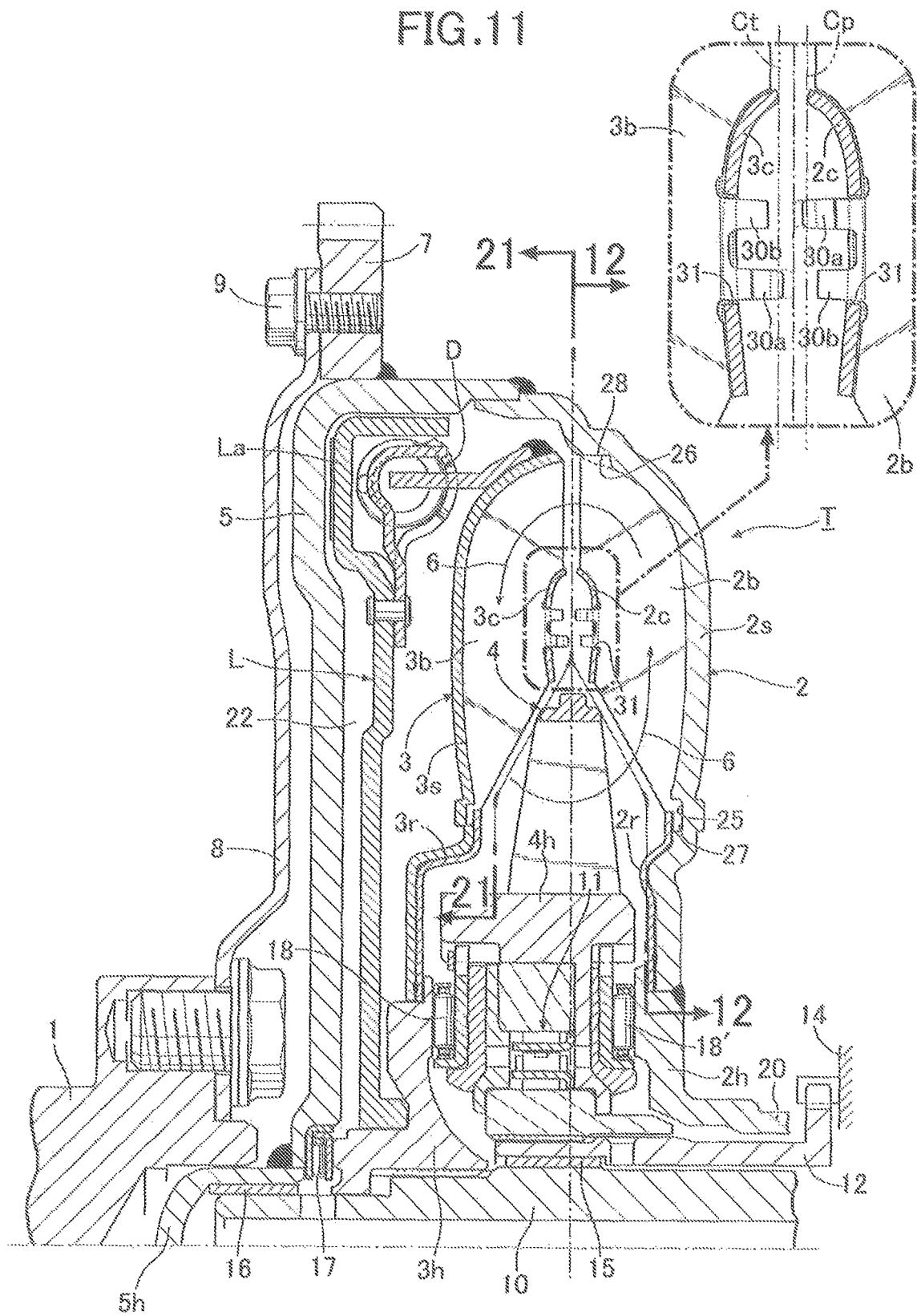
FIG. 11 is a longitudinal sectional side view of a torque converter manufactured by a manufacturing method of a second embodiment of the present invention. (second embodiment)
Figure 12:
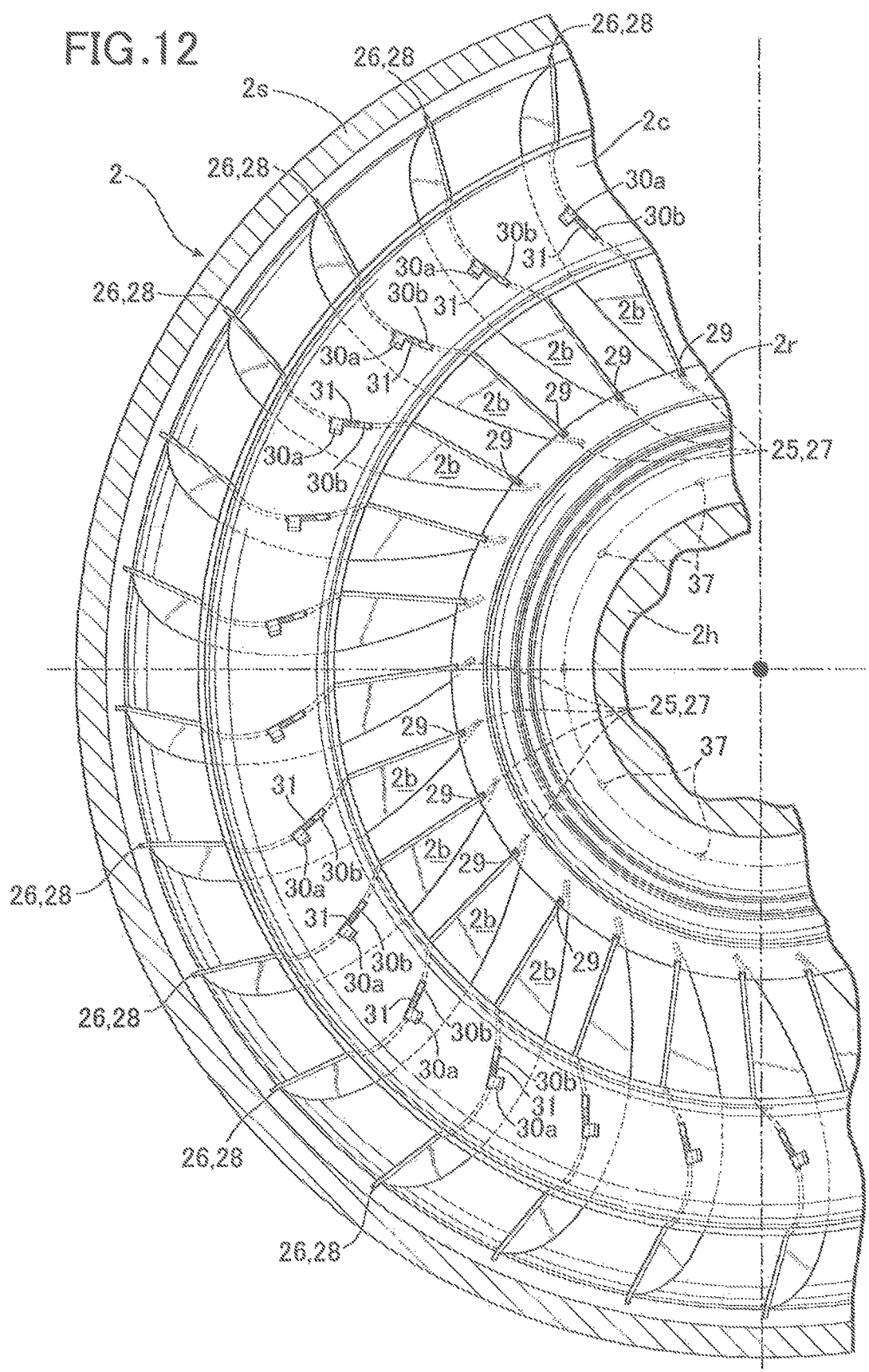
FIG. 12 is a view from arrowed line 12-12 in FIG. 11 (partial plan view of pump impeller). (second embodiment)

In FIG. 11 and FIG. 12, a torque converter T related to the second embodiment has a similar arrangement to that of the preceding embodiment apart from a pump core 2c and a turbine core 3c being formed into a flat shape and apart from the shapes of first and second projecting pieces 30a and 30b of a pump blade 2b and a turbine blade 3b; in the figures parts corresponding to those of the preceding embodiment are denoted by the same reference numerals and symbols, and duplication of the explanation is omitted.

The structure of a pump impeller 2 and a method for manufacturing same are now explained by reference to FIG. 13 to FIG. 20.

Figure 20:
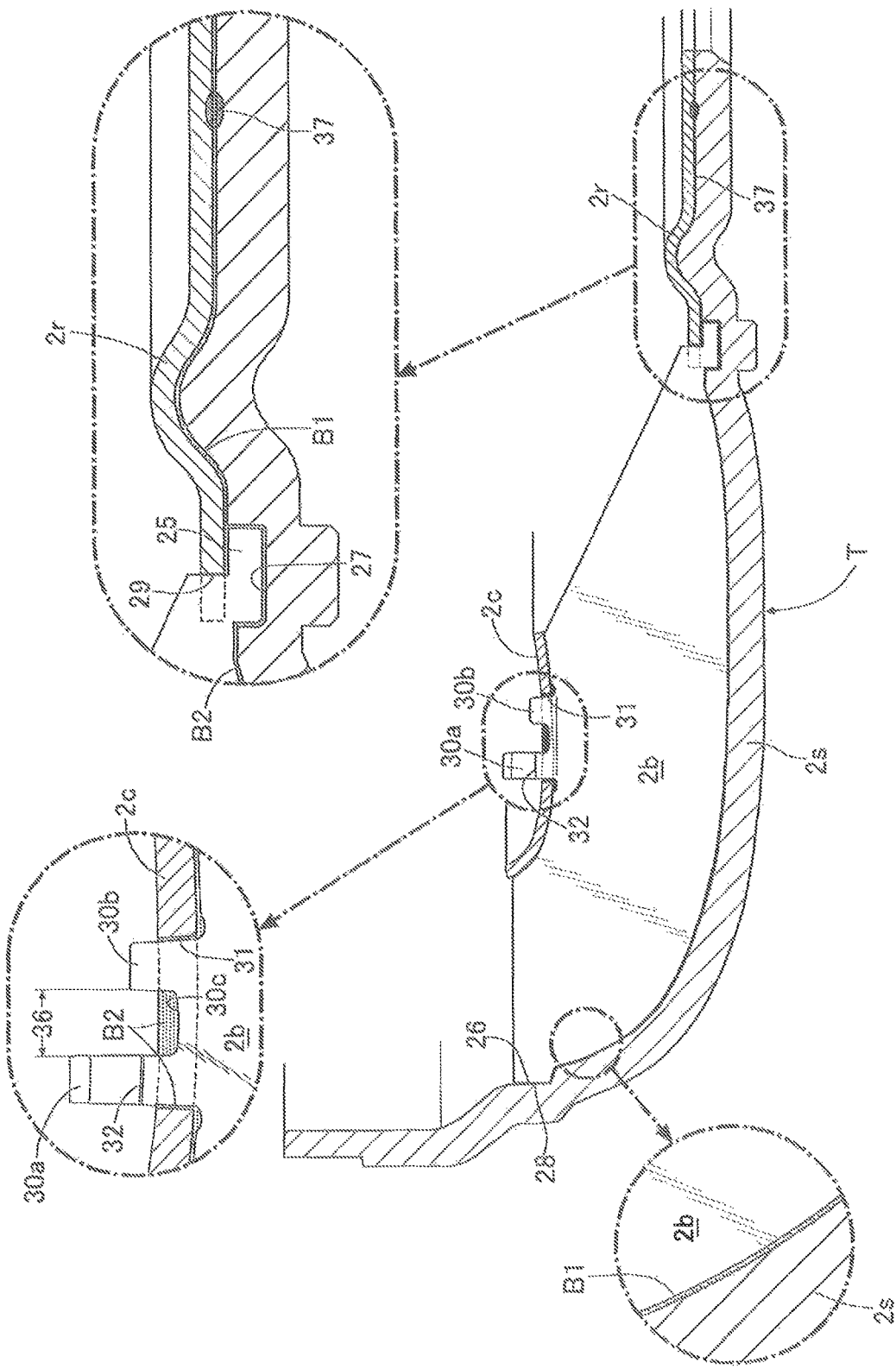
FIG. 20 is a longitudinal sectional view of a completed pump impeller. (second embodiment)

As shown in FIG. 20, the pump impeller 2 is formed from a bowl-shaped pump shell 2s, a large number of the pump blades 2b brazed to fixed positions on the inside face of the pump shell 2s, the pump core 2c linking intermediate parts of all of the pump blades 2b to each other, and an annular retainer plate 2r brazed to the inside face of the pump shell 2s and retaining radially inner end parts of the pump blades 2b.

A large number of first positioning recesses 25 and second positioning recesses 26 are formed in an inner peripheral part and an outer peripheral part of an inside face of the pump shell 2s respectively so as to be arranged in the peripheral direction, and a first positioning projection 27 and a second positioning projection 28 are formed on opposite end parts of each pump blade 2b, the first positioning projection 27 and the second positioning projection 28 being capable of engaging with the first positioning recess 25 and the second positioning recess 26 respectively.

On the other hand, the retainer plate 2r is disposed so that the outer peripheral edge presses the first positioning projections 27 of all of the pump blades 2b against the first positioning recess 25 side. Furthermore, a positioning cutout 29, with which each pump blade 2b engages, is provided in the retainer plate 2r.

Furthermore, as shown in FIG. 13, first and second projecting pieces 30a and 30b are formed on each pump blade 2b on the edge opposing the pump core 2c so as to be arranged in the longitudinal direction with a gap 36 therebetween; the first projecting piece 30a is formed so as to have a long projecting length so that its extremity goes beyond a rotational plane Cp tangential to the outer peripheral edge of the pump core 2c, whereas the second projecting piece 30b is formed so as to have a shorter projecting length than that of the first projecting piece 30a so that, in the illustrated example, its extremity does not reach the rotational plane Cp. A large number of latching holes 31 are bored in the pump core 2c, the first and second projecting pieces 30a and 30b of each pump blade 2b extending loosely through the latching hole 31. That is, each latching hole 31 is formed so as to have a cross-sectional shape that is sufficiently larger than the cross-sectional shape of the first and second projecting pieces 30a and 30b. A valley portion 30c between the first and second projecting pieces 30a and 30b is formed so as to terminate halfway into the latching hole 31. Furthermore, narrow channels 32 and 32 are formed in opposite side faces of the long first projecting piece 30a in order to make sideways bending of the first projecting piece 30a easy.

Figure 14:
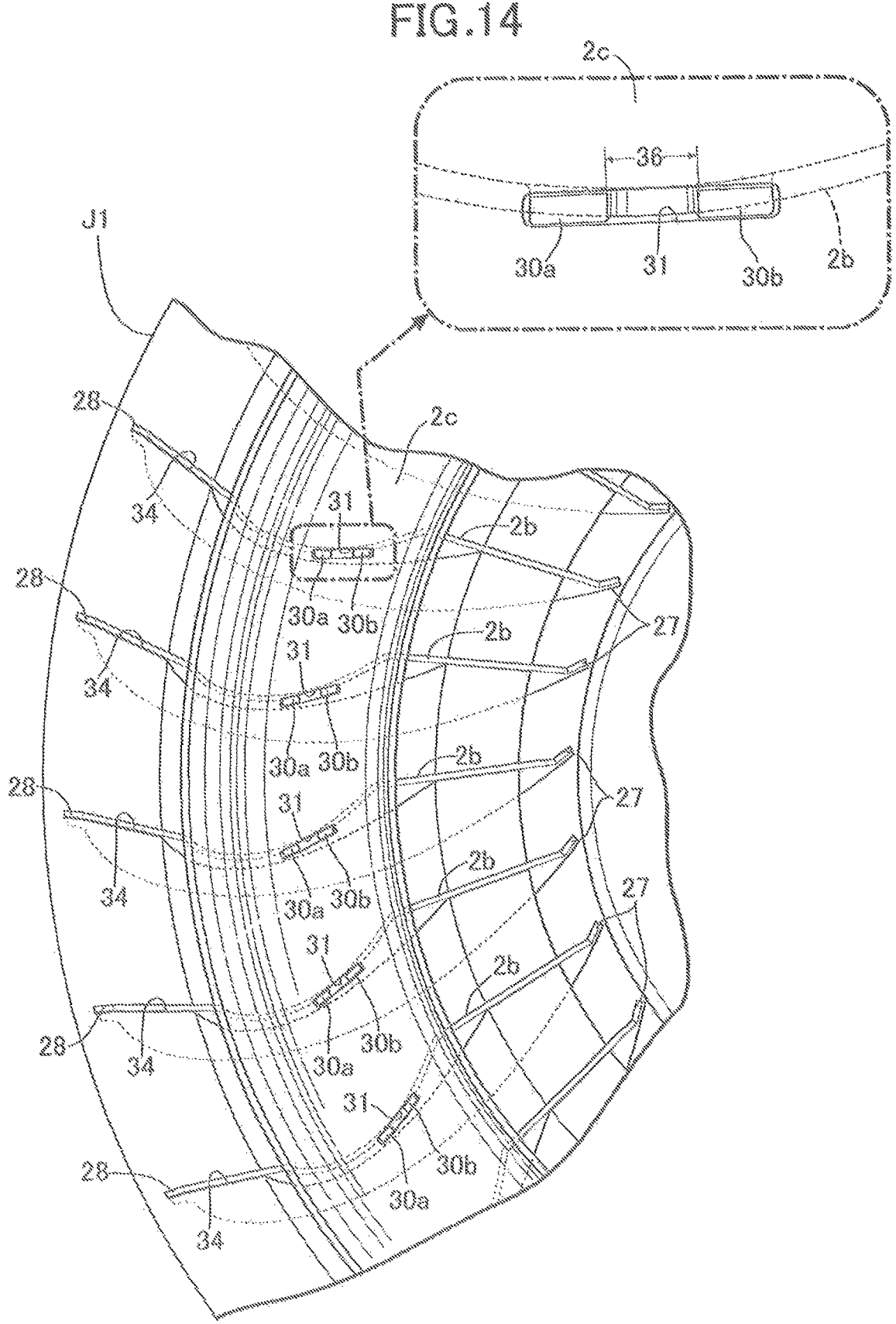
FIG. 14 is a view from arrowed line 14-14 in FIG. 13. (second embodiment)

When manufacturing this pump impeller 2, first, as shown in FIG. 13 and FIG. 14, a blade alignment jig J1 is prepared. A large number of blade positioning grooves 34 corresponding to a predetermined number of pump blades 2b of the pump impeller 2 are formed in this blade alignment jig J1, and the pump blades 2b are fitted into these blade positioning grooves 34. Subsequently, the pump core 2c is placed at a predetermined position on the group of pump blades 2b, and in this process the first and second projecting pieces 30a and 30b of each pump blade 2b are made to extend through the latching hole 31 of the pump core 2c. In this way, the predetermined number of pump blades 2b of the pump impeller 2 are aligned at predetermined positions and the pump core 2c is placed at the predetermined position on the group of pump blades 2b.

Figure 15:
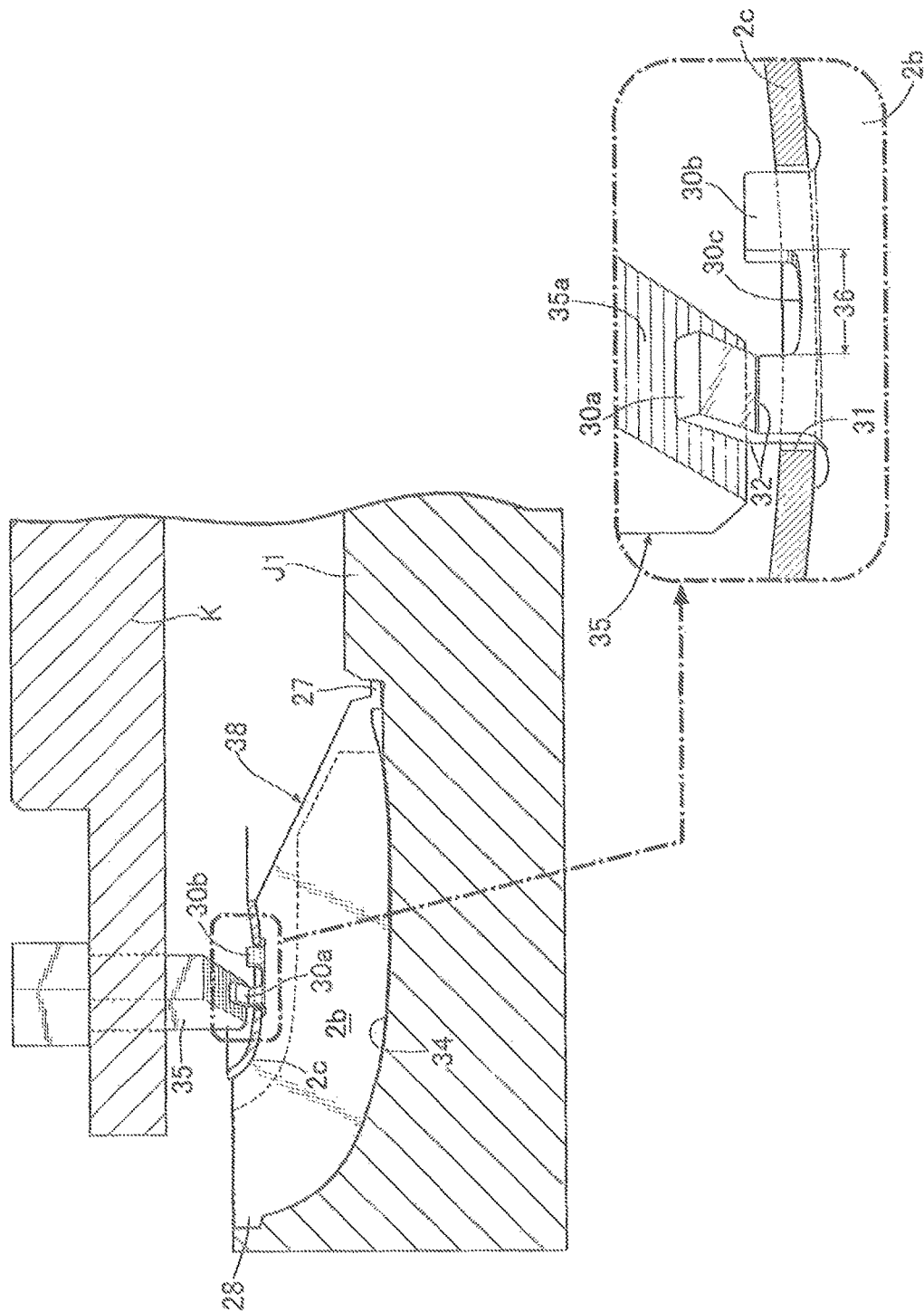
FIG. 15 is a longitudinal sectional view of a partially-finished product, showing a step of swaging the blade and the core. (second embodiment)

Subsequently, as shown in FIG. 15, a swaging tool K is lowered from above the blade alignment jig J1. This swaging tool K has a large number of swaging claws 35 on a lower face, the swaging claw opposing the first projecting piece 30a, which is long and extends through latching hole 31 of the pump core 2c. When the swaging tool K is lowered, an inclined face 35a of the swaging claw 35 is pressed against the extremity of the first projecting piece 30a so as to bend an extremity part of the first projecting piece 30a in a direction opposite to the second projecting piece 30b, and due to bending of the first projecting piece 30a the first and second projecting pieces 30a and 30b are prevented from coming out of the latching hole 31. In this arrangement, since the channels 32 are formed in opposite side faces of the first projecting piece 30a as described above, the first projecting piece 30a easily bends at the location of the channel 32. Therefore, the first projecting piece 30a can be bent with a relatively small swaging load.

The bent first projecting piece 30a is reduced in height so that its extremity is in the vicinity of the rotational plane Cp.

In this way, a blade/core provisional assembly 38 is assembled by movably linking the predetermined number of pump blades 2b to the pump core 2c in the same manner, and this is removed from the blade alignment jig J1. Since the blade/core provisional assembly 38 once assembled will not come apart, it is possible to easily carry out removal from the blade alignment jig J1, transfer, transport, and storage.

Figure 16:
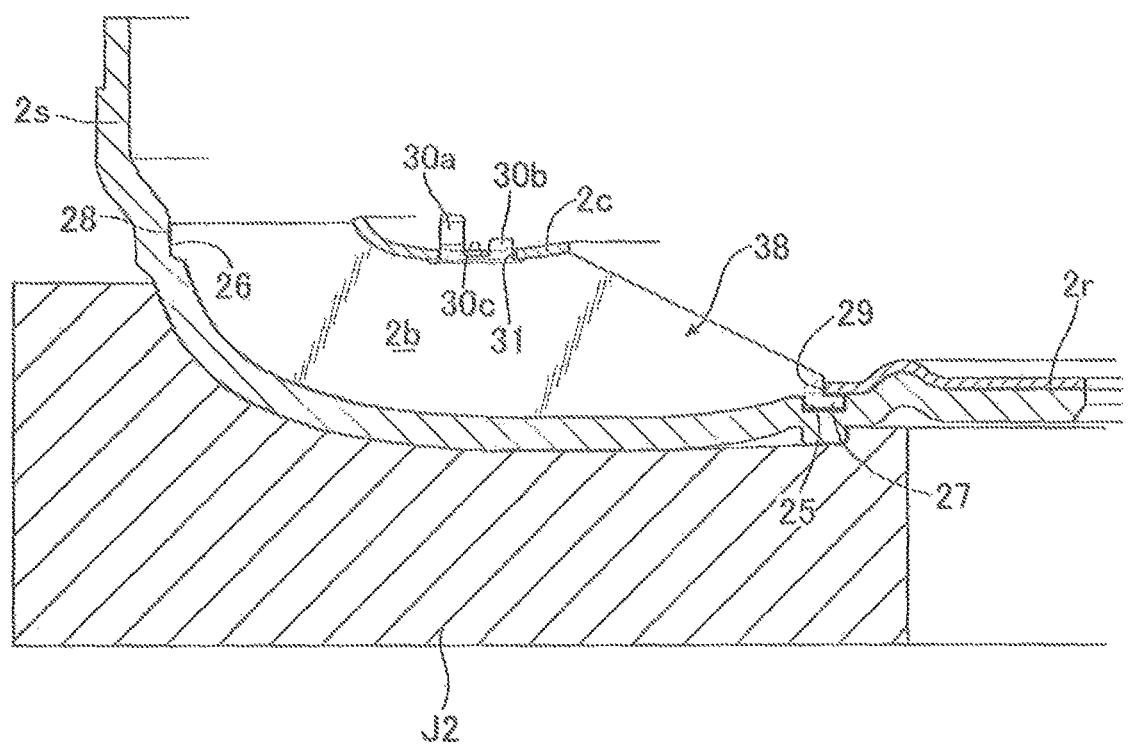
FIG. 16 is a longitudinal sectional view of a partially-finished product, showing a step of setting a blade/core provisional assembly on a shell. (second embodiment)

Subsequently, as shown in FIG. 16, the pump blades 2b of the blade/core provisional assembly 38 are positioned and set at a predetermined position on the pump shell 2s placed on an assembly jig J2. Positioning and setting of each pump blade 2b is completed by engaging the first and second positioning projections 27 and 28 of each pump blade 2b with the first and second positioning recesses 25 and 26 of the pump shell 2s respectively.

Since the predetermined number of pump blades 2b are linked to each other via the pump core 2c, they do not collapse and, moreover, since they can freely move relative to the pump core 2c in the range of the gap between the latching hole 31 and the first and second projecting pieces 30a and 30b, positioning and setting thereof can be easily carried out without requiring any skill and, furthermore, since no unreasonable load acts on the pump blades 2b, no unnecessary distortion occurs.

After positioning and setting the pump blades 2b, the retainer plate 2r for maintaining their state is laid over upper faces of inner peripheral end parts of the group of pump blades 2b and the pump shell 2s.

Figure 17:
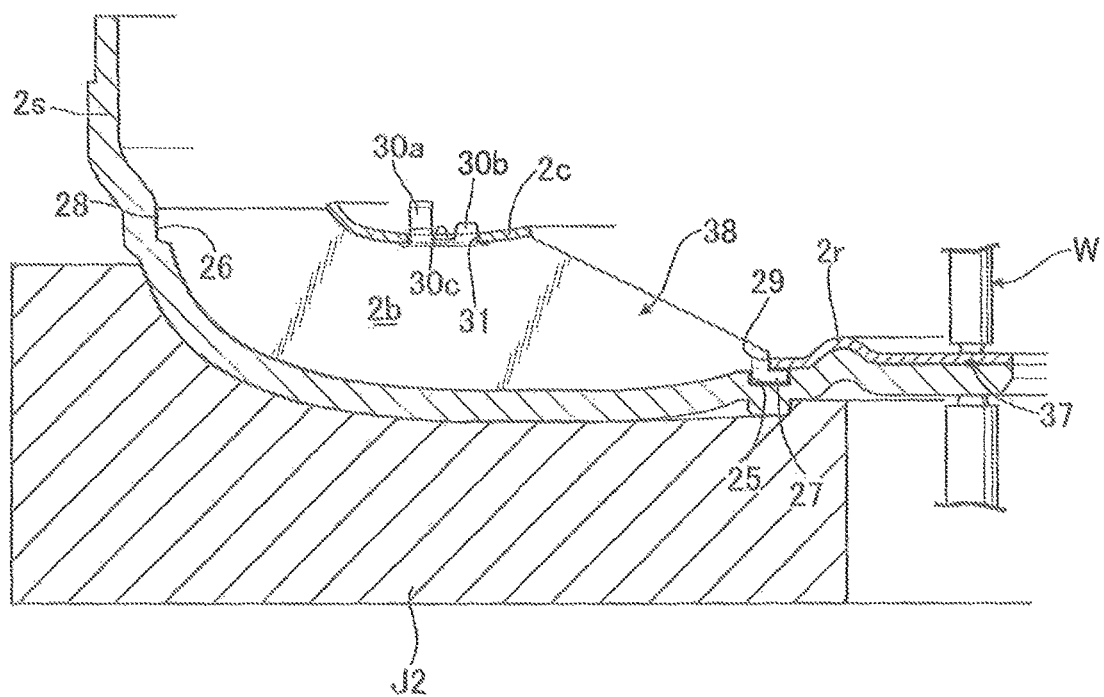
FIG. 17 is a longitudinal sectional view of a partially-finished product, showing a step of welding a pump retainer plate. (second embodiment)

As shown in FIG. 17, the retainer plate 2r is spot welded 37 (see also FIG. 12) to the pump shell 2s by a spot welder W. The blade/core provisional assembly 38 is thus provisionally retained on the predetermined position of the pump shell 2s by the retainer plate 2r.

Figure 18:
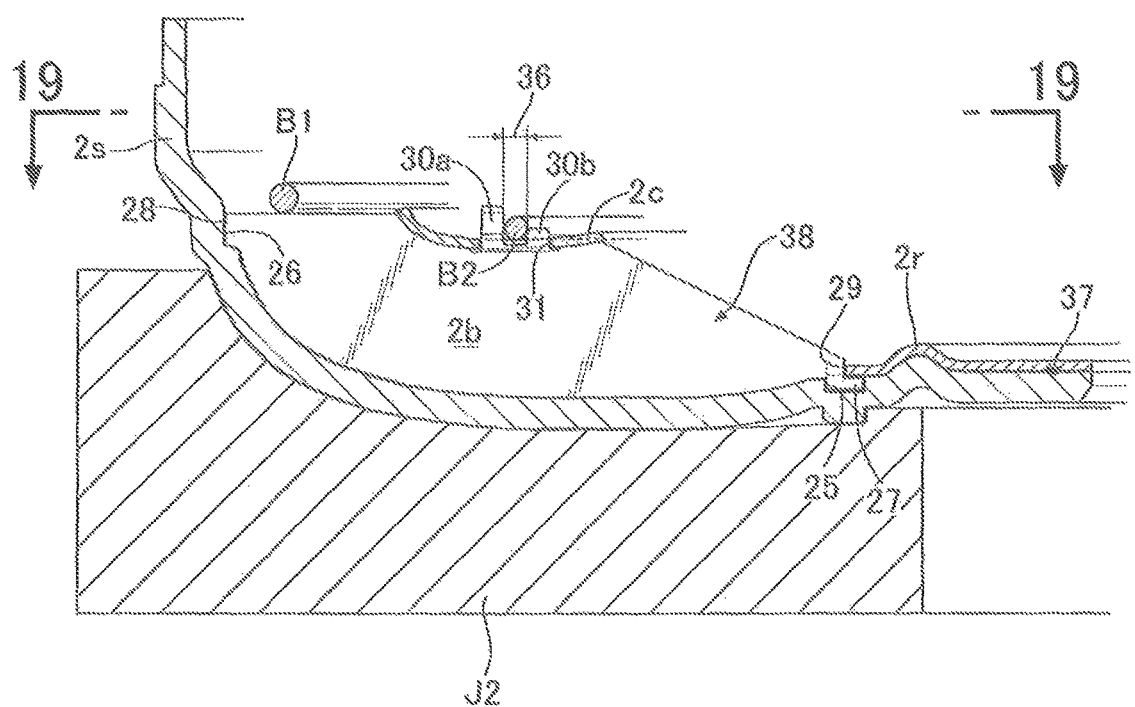
FIG. 18 is a longitudinal sectional view of a partially-finished product, showing a brazing step. (second embodiment)
Figure 19:
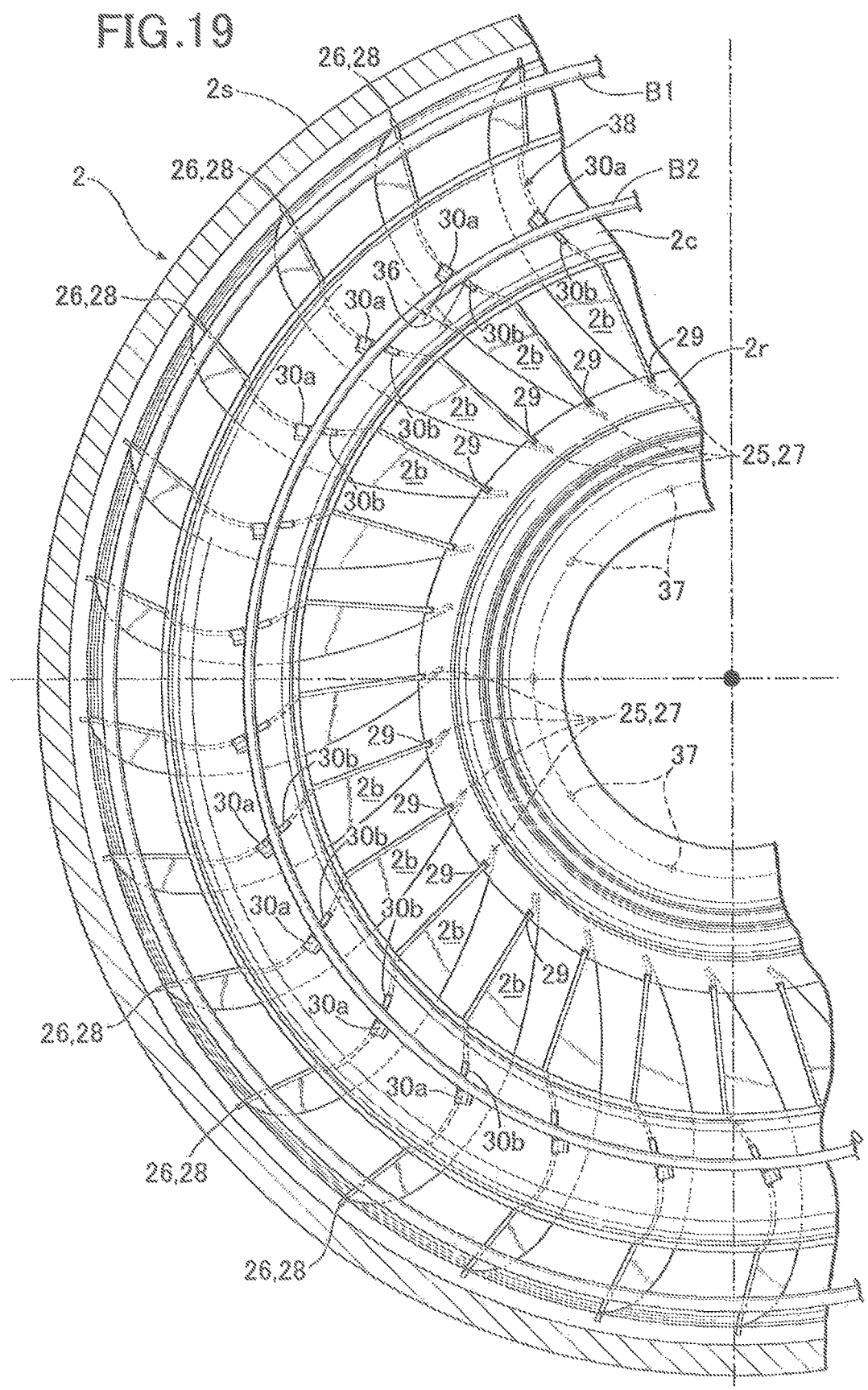
FIG. 19 is a view from arrowed line 19-19 in FIG. 18. (second embodiment)

Subsequently, the pump shell 2s having the blade/core provisional assembly 38 provisionally retained thereon is transferred from the assembly jig J2 to a heating furnace. In this heating furnace, as shown in FIG. 18 and FIG. 19, a ring-shaped first brazing material B1 is placed on upper faces of the group of pump blades 2b so as to follow an inner peripheral face of the pump shell 2s, and a ring-shaped second brazing material B2 is placed on the pump core 2c so as to engage with the gap 36 between the first and second projecting pieces 30a and 30b projecting from the latching hole 31. That is, the ring-shaped second brazing material B2 can easily and appropriately be positioned by utilizing the gap 36 between the first and second projecting pieces 30a and 30b for linking each pump blade 2b to the pump core 2c. In particular, as in the illustrated example, if a material having a wire diameter that is smaller than the gap 36 is used as the second brazing material B2, the second brazing material B2 is disposed while being in contact with the pump core 2c, and it is possible to more easily and appropriately carry out positioning of the second brazing material B2.

Subsequently, the first and second brazing materials B1 and B2 are thermally melted. The molten first brazing material B1 penetrates by virtue of the capillary phenomenon between the pump shell 2s and each pump blade 2b and between the pump shell 2s and the retainer plate 2r, and the molten second brazing material B2 penetrates between each of the first and second projecting pieces 30a and 30b and the latching hole 31. In this arrangement, since the valley bottom of the valley portion 30c between the first and second projecting pieces 30a and 30b terminates halfway into the latching hole 31, the molten second brazing material B2 does not flow out downwardly from the latching hole 31 and remains in the valley portion 30c between the first and second projecting pieces 30a and 30b, thereby ensuring that it penetrates the gap between the first and second projecting pieces 30a and 30b and the latching hole 31.

Subsequently, due to cooling and solidification of the penetrated brazing materials B1 and B2, as shown in FIG. 20 it is possible to carry out brazing between the pump shell 2s and each pump blade 2b and between the pump shell 2s and the retainer plate 2r without any distortion in the parts. In this way, it becomes possible to efficiently manufacture the high performance pump impeller 2 without any distortion in the parts and without requiring skill.

The structure of the turbine impeller 3 and a method for manufacturing same are basically the same as those for the pump impeller 2 described above. Therefore, as shown in FIG. 11, a first projecting piece 30a of a turbine core 3c before bending is formed so as to have a long projecting length so that its extremity goes beyond a rotational plane Ct tangential to the outer peripheral edge of the turbine core 3c, whereas a second projecting piece 30b is formed so as to have a shorter projecting length than that of the first projecting piece 30a, and the first projecting piece 30a after bending has a short height so that its extremity reaches the vicinity of the rotational plane Ct.

Figure 21:
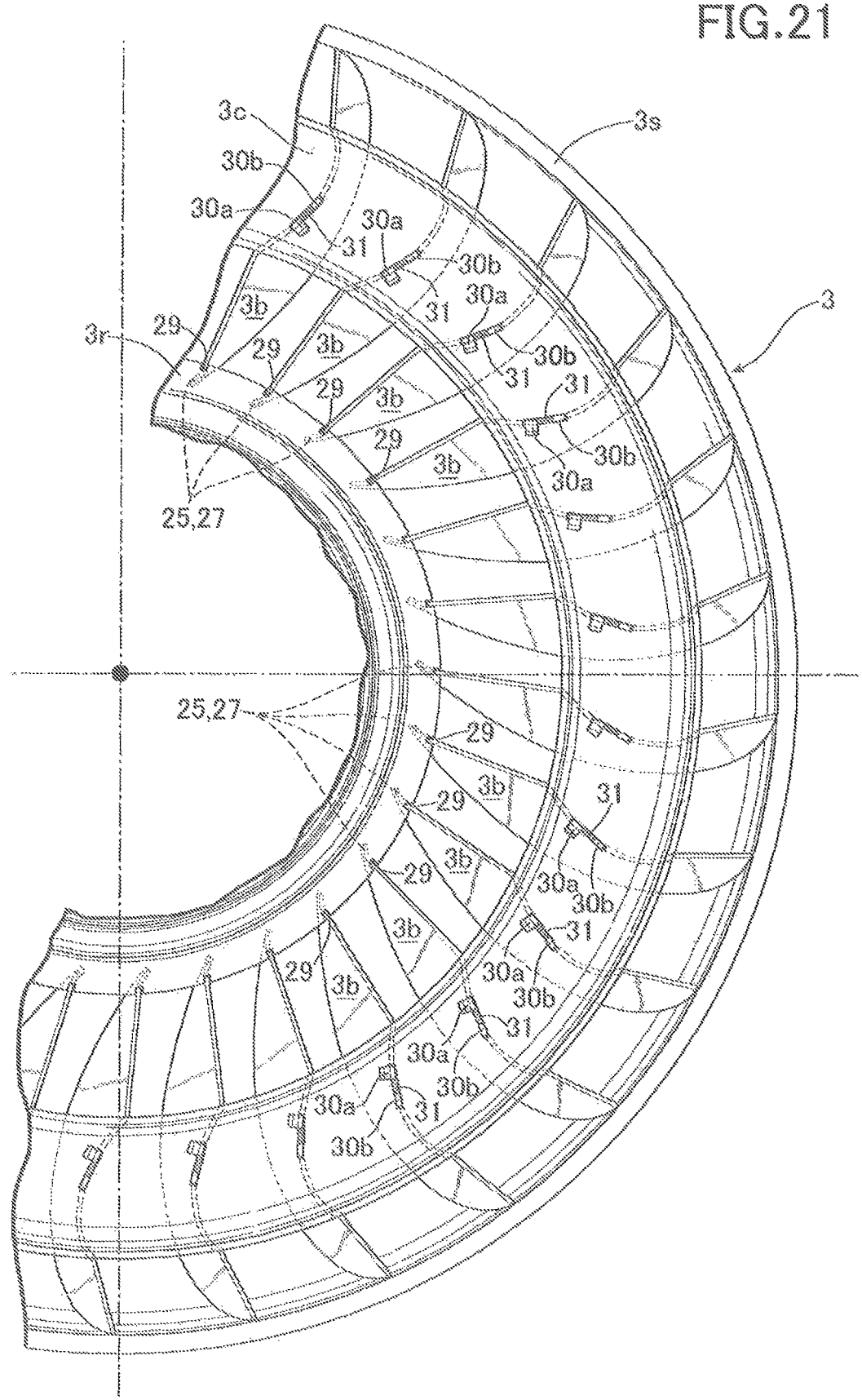
FIG. 21 is a view from arrowed line 21-21 in FIG. 11 (partial plan view of turbine impeller). (second embodiment)

The point that should be noted here is that, as shown in FIG. 11, FIG. 12, and FIG. 21, the first and second projecting pieces 30a and 30b of the turbine blade 3b extending through a latching hole 31 of the turbine core 3c are disposed so as to be staggered relative to the first and second projecting pieces 30a and 30b of the pump blade 2b. That is, the arrangement is such that the first projecting piece 30a of the turbine blade 3b, which has a long projecting length, opposes the second projecting piece 30b of the pump blade 2b, which has a short projecting length, and the second projecting piece 30b of the turbine blade 3b, which has a short projecting length, opposes the first projecting piece 30a of the pump blade 2b, which has a long projecting length. In FIG. 11 and FIG. 21, parts, corresponding to those of the pump impeller 2, of the turbine impeller 3 are denoted by reference symbols that end in the same letter, and duplication of the explanation is omitted.

Thus, in the same manner as for the pump impeller 2, it becomes possible to efficiently manufacture the high performance turbine impeller 3 without any distortion in the parts and without requiring skill. Moreover, even when the pump core 2c and the turbine core 3c are formed into a flat shape, it is possible to avoid interference between the first and second projecting pieces 30a and 30b of the pump blade 2b and the first and second projecting pieces 30a and 30b of the turbine blade 3b when the pump impeller 2 and the turbine impeller 3 rotate relative to each other.

The present invention is not limited to the above embodiments and may be modified in a variety of ways as long as the modifications do not depart from spirit and scope thereof. For example, with regard to the pump impeller 2, the second positioning recess 26 on the outer peripheral side of the pump shell 2s and the second positioning projection 28 engaging therewith may be omitted. Furthermore, the present invention may be applied to the manufacture of a fluid coupling that does not have the stator impeller 4.

The invention claimed is:

1. A method for manufacturing a fluid power transmission, the fluid power transmission comprising a pump impeller and a turbine impeller disposed so as to oppose each other,
   the pump impeller comprising a bowl-shaped pump shell,
      a plurality of pump blades that are brazed to an inside face of the pump shell so a to be aligned along a peripheral direction thereof, and an annular pump core that is brazed to inner ends of the pump blades so as to link the inner ends to each other, and
   the turbine impeller comprising a bowl-shaped turbine shell, a plurality of turbine blades that are brazed to an inside face of the turbine shell so as to be aligned along a peripheral direction thereof, and an annular turbine core that is brazed to inner ends of the turbine blades so as to link the inner ends to each other,
   wherein each pump blade has formed thereon so as to be arranged in a longitudinal direction of the pump blade a first projecting piece having a long projecting length such that an extremity thereof goes beyond a rotational plane tangential to an outer peripheral edge of the pump core and a second projecting piece having a projecting length that is shorter than that of the first projecting piece, a blade/core provisional assembly is assembled by laying the pump core over a group of pump blades while extending these first and second projecting pieces through a latching hole provided in the pump core and then bending an extremity part of the first projecting piece so as to prevent the first and second projecting pieces from coming out of the latching hole and so that the extremity comes to the vicinity of the rotational plane, the blade/core provisional assembly is subsequently set at a predetermined position on an inside face of the pump shell, the pump impeller is subsequently assembled by positioning a ring-shaped brazing material so as to engage with a gap between the first and second projecting pieces, and by carrying out brazing between the first and second projecting pieces and the latching hole and between the pump blade and the pump shell by melting the brazing material,
   wherein each turbine blade has formed thereon so as to be arranged in a longitudinal direction of the turbine blade a first projecting piece having a long projecting length such that an extremity thereof goes beyond a rotational plane tangential to an outer peripheral edge of the turbine core and a second projecting piece having a projecting length that is shorter than that of the first projecting piece, a blade/core provisional assembly is assembled by laying the turbine core over a group of turbine blades while extending these first and second projecting pieces through a latching hole provided in the turbine core and then bending an extremity part of the first projecting piece so as to prevent the first and second projecting pieces from coming out of the latching hole and so that the extremity comes to the vicinity of the rotational plane, the blade/core provisional assembly is subsequently set at a predetermined position on an inside face of the turbine shell, the turbine impeller is subsequently assembled by positioning a ring-shaped brazing material so as to engage with a gap between the first and second projecting pieces, and by carrying out brazing between the first and second projecting pieces and the latching hole and between the turbine blade and the turbine shell by melting the brazing material, and
   when the pump impeller and the turbine impeller are opposite each other, the first and second projecting pieces of the pump impeller and the first and second projecting pieces of the turbine impeller being disposed so as to be staggered with respect to each other.

2. The method for manufacturing a fluid power transmission according to claim 1, wherein a valley portion between the first and second projecting pieces of the pump impeller is formed so that a valley bottom thereof terminates halfway into the latching hole, and a valley portion between the first and second projecting pieces of the turbine impeller is formed so that a valley bottom thereof terminates halfway into the latching hole.

* * * * *